United States Patent
Arriola et al.

(10) Patent No.: US 9,762,948 B2
(45) Date of Patent: Sep. 12, 2017

(54) INFORMATION PROCESSING APPARATUS AND INFORMATION PROCESSING METHOD

(71) Applicant: Sony Computer Entertainment Inc., Tokyo (JP)

(72) Inventors: George Arriola, Los Angeles, CA (US); Anahi Bagu Casas, San Francisco, CA (US); Shinji Kimura, Los Angeles, CA (US); Shigeru Enomoto, Kanagawa (JP); Yasuhiro Yamanaka, Chiba (JP); Motoki Kobayashi, Tokyo (JP); Shuji Hiramatsu, Tokyo (JP); Yumiko Tanaka, Los Angeles, CA (US); Taku Sugawara, Tokyo (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 14/437,144

(22) PCT Filed: Oct. 30, 2013

(86) PCT No.: PCT/US2013/067421
§ 371 (c)(1),
(2) Date: Apr. 20, 2015

(87) PCT Pub. No.: WO2014/070842
PCT Pub. Date: May 8, 2014

(65) Prior Publication Data
US 2015/0271555 A1 Sep. 24, 2015

Related U.S. Application Data

(60) Provisional application No. 61/721,572, filed on Nov. 2, 2012.

(51) Int. Cl.
*H04N 21/422* (2011.01)
*H04N 21/431* (2011.01)
(Continued)

(52) U.S. Cl.
CPC ........... *H04N 21/431* (2013.01); *A63F 13/40* (2014.09); *A63F 13/52* (2014.09); *G06F 3/0482* (2013.01);
(Continued)

(58) Field of Classification Search
CPC ........... H04N 21/42204; H04N 21/431; H04N 21/4312; H04N 21/47
See application file for complete search history.

(56) References Cited

U.S. PATENT DOCUMENTS 6,281,940 B1 * 8/2001 Sciammarella .... H04N 21/4821
348/564
7,600,192 B1 * 10/2009 Hashimoto ........... G06F 3/0482
715/716

(Continued)

FOREIGN PATENT DOCUMENTS

| EP | 2447818 A1 | 5/2012 |
|---|---|---|
| JP | 2006163650 | 6/2006 |

(Continued)

OTHER PUBLICATIONS

International Search Report and Written Opinion for related Application No. PCT/US2013/67422, dated May 2, 2014.
(Continued)

*Primary Examiner* — Ricky Chin
(74) *Attorney, Agent, or Firm* — Matthew B. Dernier, Esq.

(57) ABSTRACT

A home screen display unit displays a global navigation screen 12 that is located on an upper layer with respect to a screen transition and that is used for selecting a category of
(Continued)

content to be processed. The home screen display unit displays a content zone screen 18 that is located on a lower layer with respect to a screen transition and that is used for selecting a piece of content to be processed from among a plurality of pieces of content corresponding to the category selected in the global navigation screen 12. If a specific piece of content is selected in the content zone screen 18, a game screen display unit displays a screen of the selected content. The home screen display unit displays, in the global navigation screen 12, an image of at least a portion of the content zone screen 18 with image quality lower than that in the case where the image is displayed in the content zone screen 18.

8 Claims, 13 Drawing Sheets

(51) Int. Cl.
| | |
|---|---|
| *H04N 21/47* | (2011.01) |
| *H04N 5/445* | (2011.01) |
| *H04N 21/478* | (2011.01) |
| *H04N 21/4782* | (2011.01) |
| *H04N 21/4788* | (2011.01) |
| *A63F 13/40* | (2014.01) |
| *A63F 13/52* | (2014.01) |
| *G06F 3/0482* | (2013.01) |
| *G06F 3/0484* | (2013.01) |
| *G06F 17/30* | (2006.01) |

(52) U.S. Cl.
CPC ...... *G06F 3/0484* (2013.01); *G06F 17/30994* (2013.01); *H04N 5/445* (2013.01); *H04N 21/42204* (2013.01); *H04N 21/4312* (2013.01); *H04N 21/47* (2013.01); *H04N 21/4781* (2013.01); *H04N 21/4782* (2013.01); *H04N 21/4788* (2013.01)

(56) References Cited

U.S. PATENT DOCUMENTS

| | | | |
|---|---|---|---|
| 8,813,130 B2 | 8/2014 | Yuki | |
| 2004/0123320 A1* | 6/2004 | Daily | H04N 5/44543 725/61 |
| 2005/0044565 A1* | 2/2005 | Jerding | H04N 5/44543 725/37 |
| 2005/0210410 A1* | 9/2005 | Ohwa | G06F 3/0482 715/821 |
| 2005/0235209 A1* | 10/2005 | Morita | G06F 3/0482 715/716 |
| 2007/0130545 A1 | 6/2007 | Mochizuki | |
| 2007/0157248 A1* | 7/2007 | Ellis | H04N 5/445 725/47 |
| 2007/0192739 A1* | 8/2007 | Hunleth | G06F 3/0481 715/823 |
| 2007/0233377 A1 | 10/2007 | Salay | |
| 2008/0055490 A1 | 3/2008 | Yasuda | |
| 2008/0168387 A1* | 7/2008 | Brownrigg | G06F 3/0483 715/799 |
| 2008/0276280 A1* | 11/2008 | Nashida | H04N 5/44543 725/48 |
| 2009/0111576 A1 | 4/2009 | Ostergren | |
| 2009/0125842 A1* | 5/2009 | Nakayama | G06F 3/0482 715/835 |
| 2009/0128548 A1 | 5/2009 | Gloudemans | |
| 2009/0172598 A1* | 7/2009 | Yamanaka | G06F 3/0482 715/841 |
| 2009/0177989 A1* | 7/2009 | Ma | G06F 3/0482 715/766 |
| 2009/0193461 A1 | 7/2009 | Yuki | |
| 2010/0154000 A1 | 6/2010 | Macrae | |
| 2010/0299606 A1 | 11/2010 | Morita et al. | |
| 2011/0093888 A1 | 4/2011 | Araki et al. | |
| 2011/0145764 A1 | 6/2011 | Higuchi | |
| 2011/0161882 A1* | 6/2011 | Dasgupta | H04N 21/4821 715/830 |
| 2011/0302531 A1 | 12/2011 | Takushima | |
| 2012/0165615 A1 | 6/2012 | Choi | |
| 2012/0216117 A1* | 8/2012 | Arriola | H04N 21/4821 715/716 |
| 2012/0221971 A1* | 8/2012 | Trotta | G06F 3/0482 715/803 |
| 2012/0240044 A1* | 9/2012 | Johnson | G06F 3/0481 715/716 |
| 2012/0311635 A1* | 12/2012 | Mushkatblat | H04N 21/4788 725/43 |
| 2013/0042271 A1* | 2/2013 | Yellin | H04N 5/765 725/41 |
| 2013/0212534 A1* | 8/2013 | Knight | G06F 3/0482 715/838 |
| 2014/0059628 A1* | 2/2014 | Kuo | H04N 21/4122 725/109 |

FOREIGN PATENT DOCUMENTS

| | | |
|---|---|---|
| JP | 2010009459 A | 6/2008 |
| JP | 2009182627 A | 8/2009 |
| JP | 2011257929 A | 12/2011 |
| JP | 2012209829 A | 10/2012 |
| WO | 2012038742 A1 | 3/2012 |
| WO | 2012075295 A2 | 6/2012 |

OTHER PUBLICATIONS

International Search Report and Written Opinion for related Application No. PCT/US2013/67421, dated May 2, 2014.
International Preliminary Report on Patentability and Written Opinion for related Application No. PCT/US2013/67421, dated Oct. 24, 2014.
International Search Report and Written Opinion for related Application No. PCT/US2013/006357, dated Dec. 3, 2013.
International Preliminary Report on Patentability and Written Opinion for related Application No. PCT/US2013/67422, dated May 14, 2015.
International Preliminary Report on Patentability and Written Opinion for corresponding PCT Application No. PCT/JP2013/006357, 8 pages, dated May 14, 2015.
European Search Report for corresponding EP Application No. 13851372, 7 pages, dated Jun. 16, 2016.
Japanese Office Action for corresponding JP Application No. 2015-540740, 17 pages, dated Jul. 18, 2017.
Tadashi Nezu. "Game Machines Crush Each Other in the Living Room and Smart Television: Cloud Game Enhancing Sense of Presence" Nikkei Electronics, Nikkei BP, No. 1086, 16 pages, dated Jul. 9, 2012.

\* cited by examiner

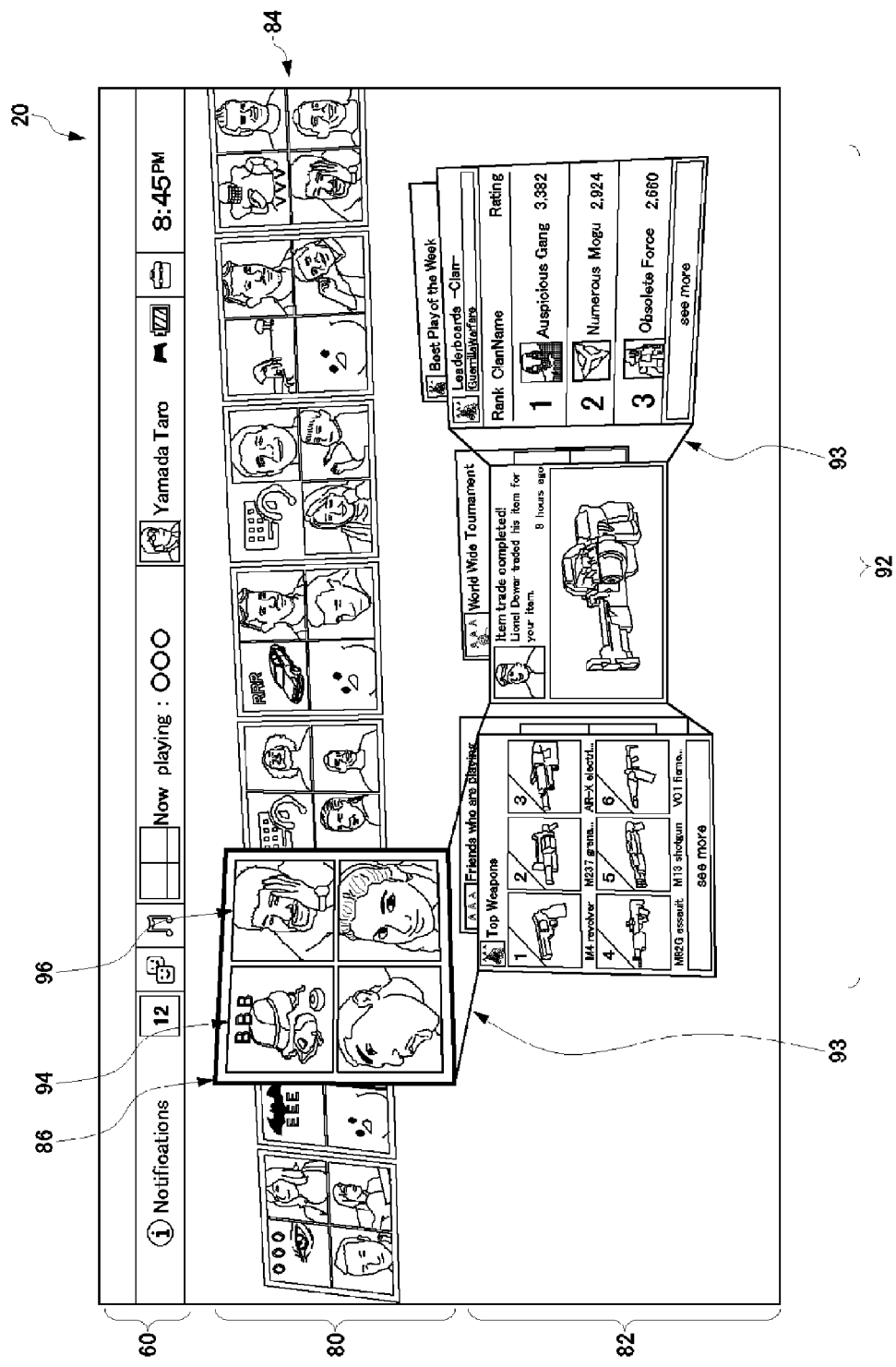

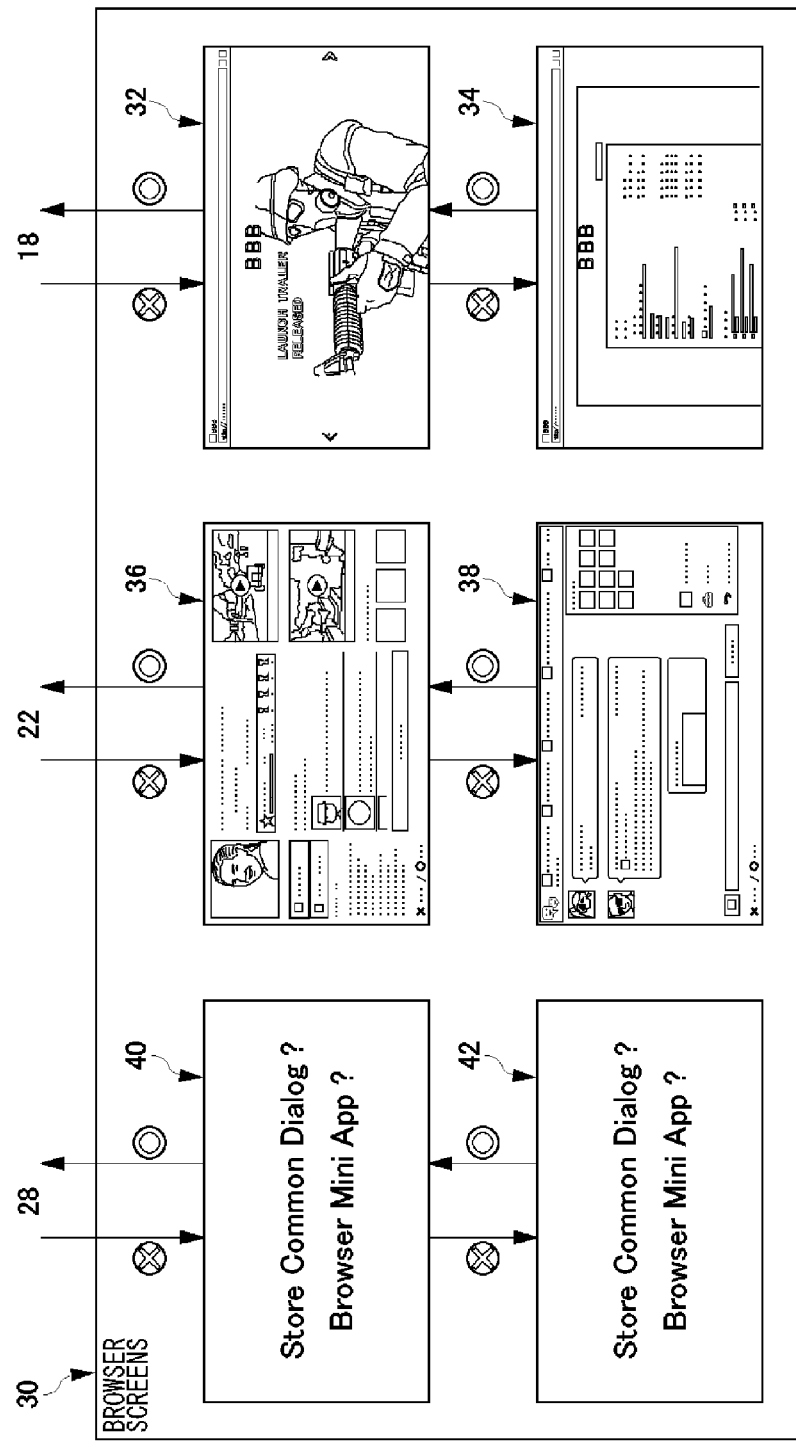

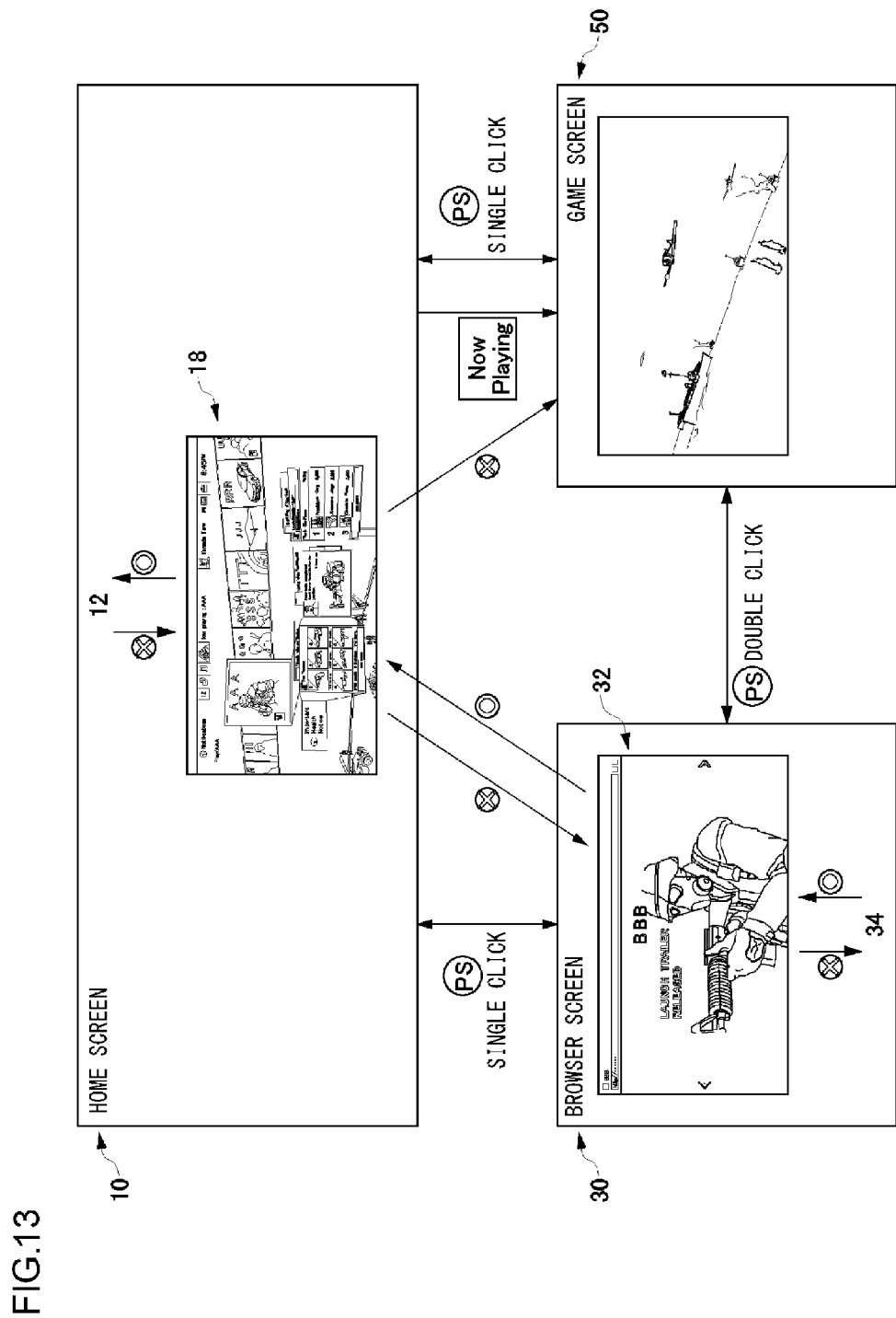

INFORMATION PROCESSING APPARATUS AND INFORMATION PROCESSING METHOD

TECHNICAL FIELD

The present invention relates to data processing technology, and more particularly, to information processing apparatuses and information processing methods for displaying a screen relating to electronic content.

BACKGROUND ART

Recent years, so-called digital electrical household appliances have become more diversified. For example, in order to record a TV program, a hard disk recorder, a DVD recorder, a composite device thereof, or the like can be used. Also in relation with playing back music, the methods thereof have become diversified, for example, playback of compressed data stored in various types of memory cards, hard disks, or the like, in addition to playback of conventional compact disks (CDs).

SUMMARY OF THE INVENTION

Problem to be Solved by the Invention

Digital electrical household appliances, particularly devices for playing back electronic content (e.g., an image, music, etc), are often installed in a shared area at home, such as a living room or the like, since such appliances are expected to be used concurrently by a plurality of persons occasionally, that is not the case with PCs. Because a small number of buttons are provided and a small display area is provided on a control panel or on a controller of digital electrical household appliances, sometimes operation details are not displayed on the main body thereof but displayed on an area of another device (e.g. on a television screen). Generally, a television screen is viewed from a distant position to a certain degree. Therefore, texts in small font or movements of a small pointer as that taking place on a PC screen are not appropriate for being displayed on a television screen. The present inventor has thought that favorable visibility and simplicity of operation are strongly required for a user interface of a digital electrical household appliance using a television screen and that an operation method generally used for a PC can not be referred to as a method that always provides excellent usability.

The present invention addresses the aforementioned problem recognition by the inventor, and a major purpose thereof is to improve user friendliness of an apparatus that processes electronic content.

Means to Solve the Problem

In order to address the aforementioned issue, an information processing apparatus is provided according to an aspect of the present invention. The information processing apparatus includes: an upper-layer screen display unit configured to display, as an upper-layer screen, a screen that is located on an upper layer with respect to a screen transition and that is used for selecting a category of content to be processed; a lower-layer screen display unit configured to display, as a lower-layer screen, a screen that is located on a lower layer with respect to the screen transition and that is used for selecting a piece of content to be processed from among a plurality of pieces of content corresponding to a category selected in the upper-layer screen; and a content screen display unit configured to display a screen of selected content if a specific piece of content is selected in the lower-layer screen. The upper-layer screen display unit displays, in the upper-layer screen, an image of at least a portion of the lower-layer screen with image quality lower than that in the case where the image is displayed in the lower-layer screen.

According to another aspect of the present invention, an information processing method is provided. This method includes: displaying, as an upper-layer screen, a screen that is located on an upper layer with respect to a screen transition and that is used for selecting a category of content to be processed; displaying, as a lower screen, a screen that is located on a lower layer with respect to the screen transition and that is used for selecting a piece of content to be processed from among a plurality of pieces of content corresponding to a category selected in the upper-layer screen; and displaying a screen of selected content if a specific piece of content is selected in the lower screen. The displaying the upper-layer screen includes displaying, in the upper-layer screen, an image of at least a portion of the lower screen with image quality lower than that in the case where the image is displayed in the lower screen.

According to yet another aspect of the present invention, an information processing apparatus is provided. This apparatus includes: a content icon display unit configured to arrange and display a plurality of content icons indicating a plurality of pieces of content in a first area in a content selection screen; a cursor display unit configured to display a cursor for focusing on one of the plurality of content icons; a content playback unit configured, if a specific content icon is focused on by the cursor, and if a preset determination operation is performed, to start playback of the content indicated by the focused icon; a related information acquiring unit configured, if a specific content icon is focused on by the cursor, to acquire related information relating to the content registered in an external device from the external device without starting playback of the content indicated by the focused icon; and a related information display unit configured to display the related information acquired by the related information acquiring unit in a second area of the content selection screen, and if related information is updated, configured to display the updated related information in the second area so as to replace the related information having been displayed until that moment.

According to yet another aspect of the present invention, an information processing method is provided. This method includes: arranging and displaying a plurality of content icons indicating a plurality of pieces of content in a first area in a content selection screen; displaying a cursor for focusing on one of the plurality of content icons; starting, if a specific content icon is focused on by the cursor, and if a preset determination operation is performed, playback of the content indicated by the focused icon; acquiring, if a specific content icon is focused on by the cursor, related information relating to the content registered in an external device from the external device without starting playback of the content indicated by the focused icon; and displaying the acquired related information in a second area of the content selection screen, and if related information is updated, displaying the updated related information in the second area so as to replace the related information having been displayed until that moment.

According to yet another aspect of the present invention, an information processing apparatus is provided. This apparatus includes: a menu screen display unit configured to display a menu screen indicating a plurality of menus; a game screen display unit configured, if an execution menu of a game application is selected in the menu screen, to display in full screen a game screen indicating an execution result of the game application; an application screen display unit configured, if an execution menu of an application other than a game is selected in the menu screen, to display in full screen an application screen indicating an execution result of the application other than a game; and a screen transition control unit configured to allow a direct transition from the game screen to the application screen if a predetermined first operation is performed while the game screen is displayed, and configured to allow a direct transition from the application screen to the game screen if the predetermined first operation is performed while the application screen is displayed.

According to yet another aspect of the present invention, an information processing method is provided. This method includes: displaying a menu screen indicating a plurality of menus; displaying in full screen, if an execution menu of a game application is selected in the menu screen, a game screen indicating an execution result of the game application; displaying in full screen, if an execution menu of an application other than a game is selected in the menu screen, an application screen indicating an execution result of the application other than a game; and allowing a direct transition from the game screen to the application screen if a predetermined first operation is performed while the game screen is displayed, and allowing a direct transition from the application screen to the game screen if the predetermined first operation is performed while the application screen is displayed.

Optional combinations of the aforementioned constituting elements, and implementations of the invention in the form of methods, apparatuses, systems, computer programs, and recording media that store computer programs may also be practiced as additional modes of the present invention.

Advantageous Effect of the Invention

According to the present invention, user friendliness of an apparatus that processes electronic content can be improved.

BRIEF DESCRIPTION OF THE DRAWINGS

FIG. 11 shows a content zone screen;
FIG. 12 schematically shows browser screens and screen transitions among the browser screens;
and
FIG. 13 schematically shows screen transitions among a home screen, a browser screen, and a game screen.

MODE FOR CARRYING OUT THE INVENTION

A multimedia playback system according to the embodiment is an information processing system that plays back or executes (herein after referred to as "plays back") a plurality of types of electronic content including still image content, moving image content, music content, broadcast content, game software content, or the like in a multimedia playback device. A screen of a television receiver is used as a display screen of the multimedia playback device, and information displayed on the display screen and operation buttons on a controller are used as control means.

A multimedia playback device (referred as a "game console 200" in the following embodiments) according to the embodiment integrates playbacks of a plurality of pieces of content under a common user interface, which provides a user with common operability. This user interface is assumed to be operated by a user using a controller that has more operational limitation in comparison with a keyboard, a mouse, or the like (typically, a controller with a small number of control options which can be input) at about 3 meters distance from a television receiver. Three major features of the multimedia playback device according to the embodiment will be given below.

(1) Navigation to the start of playback of content (in other words, navigation that supports selection of content to be played back) is hierarchized and is displayed so that a user can intuitively grasp relations between screens on respective layers.

(2) Before starting the playback of content, the latest information on the content managed by a server (herein after also referred to as a "content related information.") is provided to a user.

(3) An interface that can easily switch between a content play back screen image and a screen image for displaying content related information.

In this manner, user friendliness can be improved by providing a user interface that implements a visual effect that appeals intuitively to a user and simple operability.

First Embodiment

Figure 1:
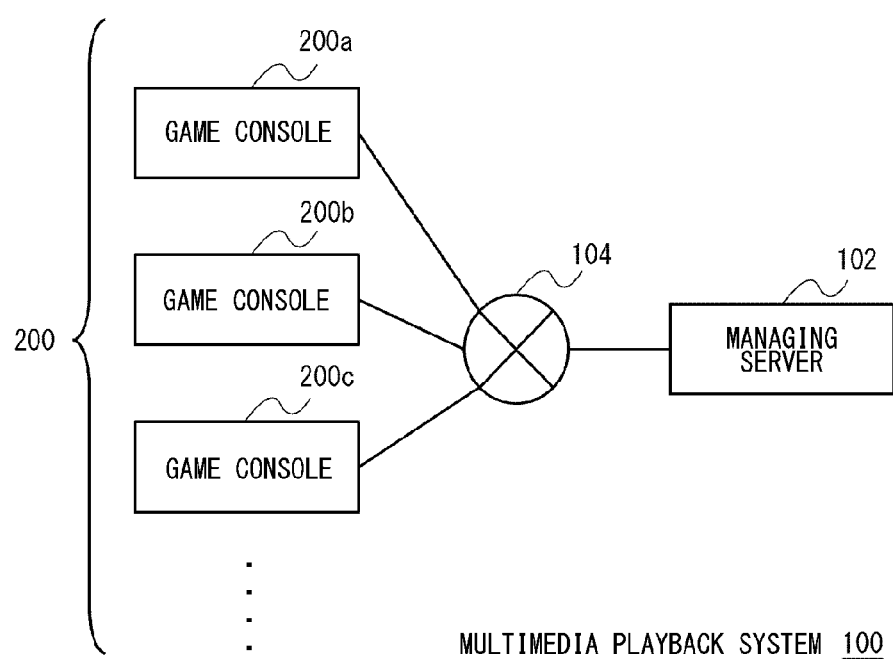
FIG. 1 shows a configuration of a multimedia playback system according to an embodiment.

FIG. 1 shows a configuration of a multimedia playback system according to an embodiment. The multimedia playback system 100 comprises a game console 200a, a game console 200b, a game console 200c (herein after referred to as a "game console 200" when referred collectively) as multimedia playback devices, and a managing server 102. The game console 200 and the managing server 102 are connected with each other via a communication network 104 including a LAN, a WAN, the Internet, or the like. A plurality of managing servers 102 that manage different information may be provided. The game console 200 may set one of the managing servers 102 as a server to access in accordance with information to be acquired.

The managing server 102 collects a playback status of content (e.g., data indicating the name of a game being played, the progression status of the game, or the like) in each of the plurality of the game consoles 200 connected to the communication network 104, from each of the game console 200s and stores the playback status as content related information. Further, for each of a plurality of pieces of content that can be played back in the game console 200, the managing server 102 accepts the registration of related information of each piece of content from an external device (e.g., a game console 200 or a PC (not shown)) and stores the related information.

The managing server 102 typically stores a plurality of types (e.g., three to nine types) of content related information for one piece of content (e.g., one game title or one music tune). Content related information for a certain game title includes, for example, following information.

(1) User information on a user who is currently on line, typically, who is playing a game.

(2) User's impressions on a game.

(3) A moving image or a still image captured while playing a game and uploaded by a user.

(4) The progress status of a game for a user.

(5) The status of a player's character of a user.

(6) Information on various types of communities (e.g., call for participants for a party, call for participants for a tournament, etc).

(7) Item information (newly arrived items that can now be purchased in a game, etc).

(8) An advertisement of other content (including, for example, a game of other title belonging to a same series, and further including not only a game but also a related music tunes or book, etc).

(9) Information on a bulletin board for users to exchange information among one another.

The managing server 102 stores both "detailed related information" and a "related information summary" for each of a plurality of types of content related information, and provides either the "detailed related information" or the "related information summary" in accordance with a request from a game console 200. The detailed related information is the content related information in its entirety, and is information to be displayed on a browser screen 40, which will be described later. The related information summary is summarized detailed related information, which is summarized according to a predetermined rule (in other words, reduced detailed related information, with which the amount of information is reduced) and is information to be displayed in a live item 92, which will be described later.

In addition, the managing server 102 stores user information for each of the plurality of game consoles 200 in the multimedia playback system 100 in a similar manner as that of the content related information. Upon receiving from a certain game console 200 a request to provide user information, the managing server 102 provides user information on one or more users of another game console 200 for the game console 200 that has sent the request. For example, the managing server 102 provides an image and attribute information relating to a friend user, whom a user of the game console 200 having sent the request registered with the managing server 102.

In this manner, the managing server 102 stores various types of information to be displayed in a variety of interfaces of the game consoles 200, and provides the information to the game consoles 200 as appropriate. For example, when a content zone screen 20 shown in FIG. 11, which will be described later, is displayed in the game console 200, for each of the plurality of pieces of content that have recently played back by the user, the managing server 102 transmits to the game console 200 attribute information of a friend user who has played back a same piece of content. This attribute information includes an image and text that a friend user has registered with the managing server 102 in advance.

Figure 2:
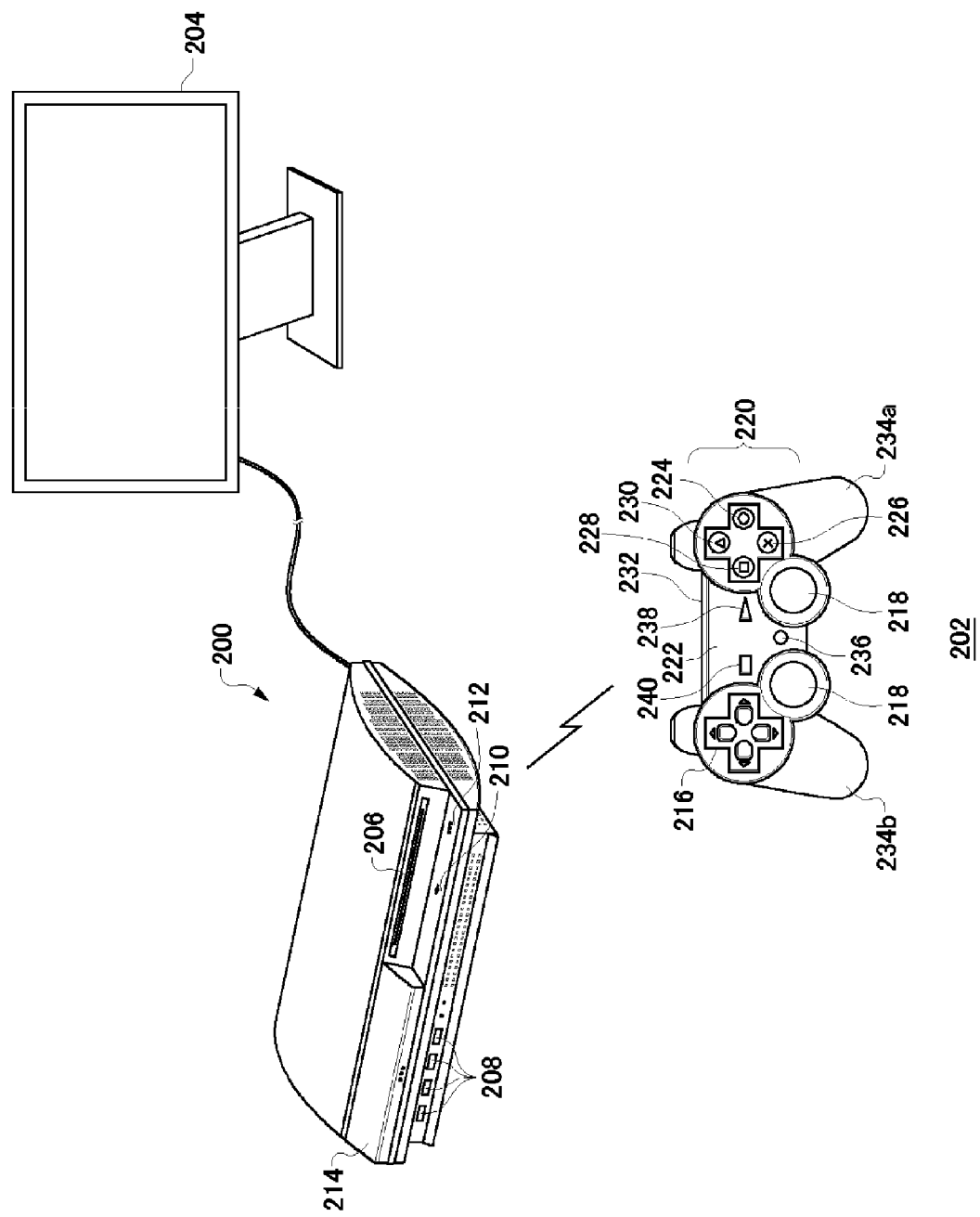
FIG. 2 shows an outward structural appearance of a game console shown in FIG. 1.

A detailed explanation on the game console 200 will be given below. FIG. 2 shows an outward structural appearance of the game console 200 shown in FIG. 1. Although the game console 200 is represented by a stationary game device according to the embodiment, the game console 200 may be a portable game device formed integrally with a display device. The game console 200 is connected to a controller 202 and to a television monitor 204. The game console 200 is provided with a function of executing various types of games, a function of creating and editing emails, a function of viewing web pages, a function of playing back movies or music, or the like. The controller 202 is connected to the game console 200 wirelessly. The television monitor 204 is connected to the game console 200, and not only displays game information, game image, web pages, movies, or the like, but also outputs sound. Although not shown in FIG. 2, the game console 200 is connected to the Internet by being connected to a communication device (e.g., a router or the like) via a LAN cable.

The game console 200 is provided with a disk insertion slot 206 for an optical disk having a diameter of 12 cm, a USB connecting terminal 208, etc. The disk insertion slot 206 is configured so as to be able to load an optical disk such as a Blu-ray (BD) Disk (trademark or registered trademark), a DVD-ROM, a CD-ROM, or the like. A touch sensor 210 is a sensor for removing a disk, and a touch sensor 212 is a sensor for turning on/off the power. Although not shown in the figures, a power switch, an audio-visual output terminal, an optical digital output terminal, an AC power input terminal, a LAN port, an HDMI terminal, and the like are provided on the back of the game console 200. In addition, the game console 200 may have an IEEE1394 terminal so as to be able to communicate via IEEE1394.

The game console 200 is also provided with a multimedia slot. A multimedia slot case 214 is a cover member and, although not shown in the figures, is configured so that the multimedia slot is exposed when the multimedia slot case 214 is open.

The game console 200 performs various types of processes for, for example, executing a game, composing, editing, and receiving an email, and browsing a Web page in accordance with an application program for a game, an email, or a Web browser and with an instruction from the user via the controller 202. The application program may be any application program that is loaded from various types of recording media such as an optical disk (e.g., a CD-ROM, a DVD-ROM, and a BD), a hard disk drive, or semiconductor memory, or may be an application program that is downloaded via various types of transmission media such as a LAN and a CATV circuit.

In addition to executing a game, composing, editing, receiving an email, browsing a Web page, etc., which are based on application programs, the game console 200 can play back (or decode) video and audio data, for example, audio data recorded in a CD, a movie recorded in a DVD or a BD, etc. The game console 200 can also operate based on other various types of application programs. A driver program for playing back a DVD or a BD is recorded in, for example, a hard disk drive 334 built in the game console 200.

The controller 202 is activated by a battery (not shown) and is provided with a plurality of buttons and keys for entering operation input to make a game or the like progress. When the user operates the button or the key of the controller 202, the operation input is transmitted to the game console 200 wirelessly or by wires.

The controller 202 is provided with a direction key 216, an analog stick 218, and four kinds of operation buttons 220. The direction key 216, the analog stick 218, and the operation buttons 220 are input units provided on a housing upper surface 222. The four types of buttons 224, 226, 228, and 230 are marked with different symbols in different colors that each button is distinguished from another. More specifically, a circle button 224 is marked with a red circle, a cross button 226 with a blue cross, a square button 228 with a purple square, and a triangle button 230 with a green triangle. Although not shown in the figures, a housing rear surface 232 of the controller 202 is provided with a plurality of LEDs.

The user holds a left grip part 234b with his or her left hand and a right grip part 234a with his or her right hand so as to operate the controller 202. The direction key 216, the analog stick 218, and the operation buttons 220 are provided on the housing upper surface 222 so that the user can operate while holding the left grip part 234b and the right grip part 234a.

A button with an LED (herein after referred to as a "PS button 236") is also provided on the housing upper surface 222. The PS button 236 is used, for example, so that the game console 200 displays a menu screen. The PS button 236 has a function of notifying the user of an incoming mail and/or indicating the charging state of the battery of the controller 202 by the light-emitting state of the LED. For example, the LED is lit in red while recharging and in green when the recharging is completed, and the LED is lit in red so as to blink when the remaining battery is low. Further, a select button 240 and a start button 238 are also provided on the housing upper surface 222, and predetermined functions are allocated to the buttons 240 and 238, respectively.

For example, direction indicator keys indicating "up," "down," "left," and "right" directions are provided on the direction key 216. The direction indicator keys are operated by a user when moving a game character of a game upward, downward leftward or rightward on a screen, when moving a text input cursor upward, downward leftward or rightward on an email compose screen, when scrolling a page while browsing a Web page, or when moving a cursor upward, downward leftward or rightward on a screen. The direction indicator keys indicating "up," "down," "left," and "right" directions are used to indicate not only an up, down, left, or right direction but also a diagonal direction. For example, the user can indicate, to the game console 200, a diagonally up right direction by concurrently pressing both the direction indicator key indicating "up" direction and the direction indicator key indicating "right" direction. The same applies to other direction indicator keys. For example, the user can indicate, to the game console 200, a diagonally down left direction by concurrently pressing both the direction indicator key indicating "down" direction and the direction indicator key indicating "left" direction.

Different functions are assigned to the respective operation buttons 220 by the application program. For example, a function of designating the display of a menu is assigned to the triangle button 230, a function of designating the cancellation or the like of a selected item is assigned to the circle button 224, a function of designating the confirmation or the like of the selected item is assigned to the cross button 226, and a function of designating, for example, the display or non-display of a table of contents is assigned to the square button 228. It is needless to mention that the function of designating the confirmation or the like of the selected item may be assigned to the circle button 224, and a function of designating the cancellation or the like of a selected item may be assigned to the cross button 226, as a variation of the embodiment.

The analog stick 218 is provided with: a rotor that allows for a tilting operation in any direction around a rotating fulcrum of the operation shaft; and a variable-analog-value output means for outputting a variable analog value according to the operation of the rotor. The rotor is provided at the tip of the operation shaft, which is provided such that an elastic member allows the operation shaft to return to its neutral position. The rotor keeps a position (a reference position) of being in an upright state (in a state of no tilting) when no tilting operation is performed by the user. The variable-analog-value output means is provided with a variable resistance element, etc. The resistance of the variable resistance element changes in accordance with the operation of the rotary operator. When the rotary operator of the analog stick 218 is operated to tilt, the controller 202 detects a coordinate values on an X-Y coordinate based on the amount of the inclination with respect to the reference position and on the direction of the inclination and transmits the coordinate values to the game console 200 as an operation output signal.

Figure 3:
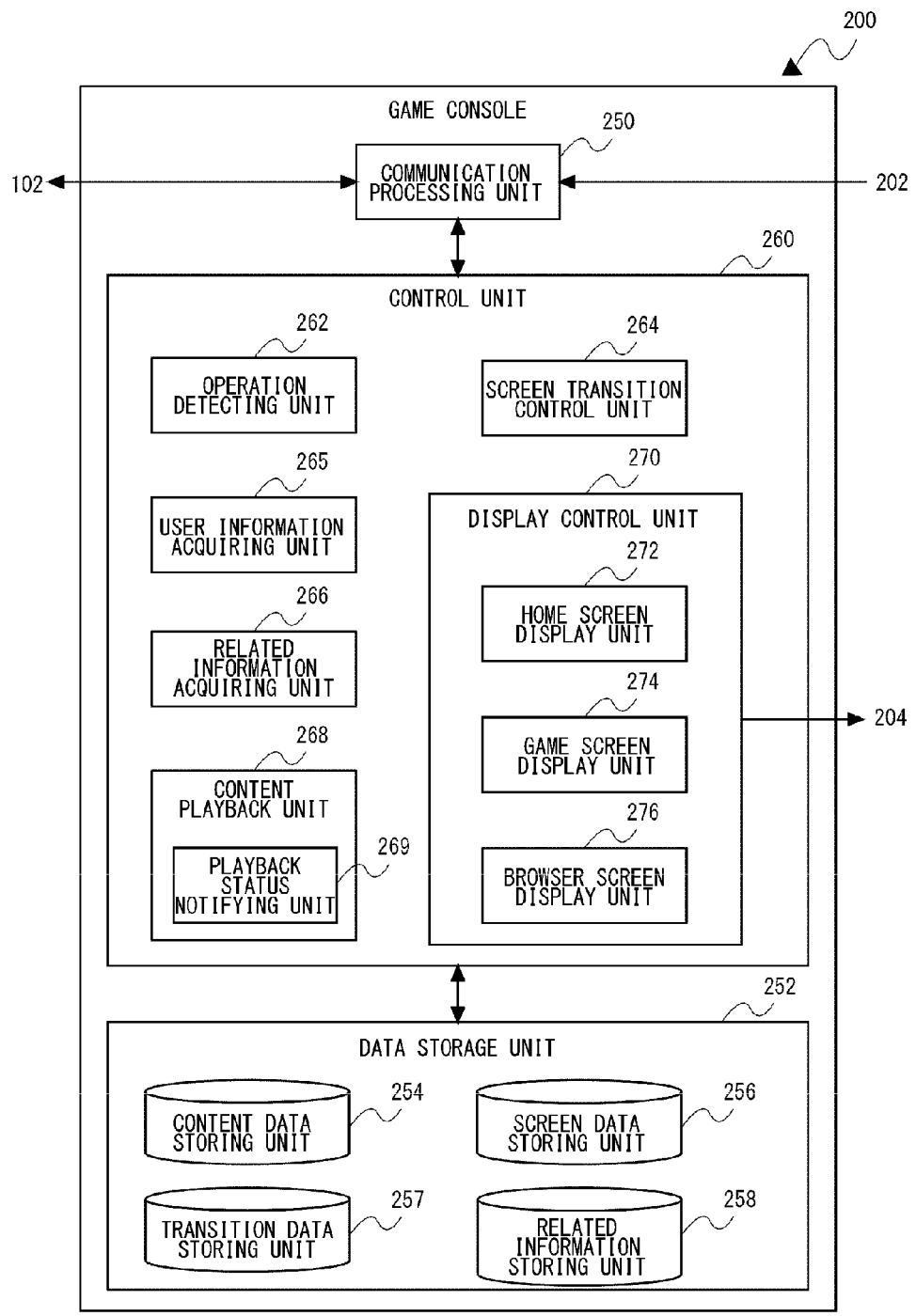
FIG. 3 is a block diagram illustrating a functional configuration of the game console shown in FIG. 1.

FIG. 3 is a block diagram illustrating a functional configuration of the game console 200 shown in FIG. 1. The game console 200 comprises a communication processing unit 250, a data storage unit 252, and a control unit 260. The elements shown in the block figure are implemented by an element device (e.g., a CPU, a GPU, a memory of a computer or the like) and/or machinery and equipment in terms of hardware components, and a computer program or the like in terms of software components. The figure depicts functional blocks implemented by cooperation of these components. Therefore, it will be obvious to those skilled in the art that the functional blocks may be implemented in a variety of ways, by hardware only, software only, or a combination thereof. The same applies to the following block figures.

For example, program modules corresponding to functional blocks in the control unit 260 may be stored in a hard disk or in a flash memory in the game console 200, and a CPU or a GPU of the game console 200 may read out and load the program modules to a main memory as appropriate, and may execute the program modules, so as to implement the functions of the control unit 260. The functions of the data storage unit 252 may be implemented by a hard disk and/or a flash memory of the game console 200.

The communication processing unit 250 controls communication to and from the managing server 102. The communication processing unit 250 transmits data passed from the control unit 260 to the managing server 102, and passes data received from the managing server 102 to the control unit 260. The communication processing unit 250 also controls communication to and from the controller 202. The communication processing unit 250 receives data indicating details of an operation on the controller 202 and passes the data to the control unit 260.

The data storage unit 252 is a storage area that stores various types of data for data processing by the control unit 260. The data storage unit 252 comprises a content data storing unit 254, a screen data storing unit 256, a transition data storing unit 257, and a related information storing unit 258.

The content data storing unit 254 stores data of electronic content installed on the game console 200. This data is various types of application data that can be played back with the game console 200, for example, data for playing back a game, a music tune, a variety of moving images, still images, or the like. The data also includes thumbnail images of content. In addition, the content data storing unit 254 stores playback histories of content in the game console 200.

The screen data storing unit 256 comprises a plurality of storage areas for storing data of a home screen, a browser screen, and a game screen, which will be described later, respectively. Data of a home screen, a browser screen, and/or a game screen that is recently browsed or that is the latest version is stored in each of the storage areas. Data in each of the storage areas is updated as appropriate along with data processing (e.g., screen update processing) by the control unit 260.

The transition data storing unit 257 stores information indicating a transition-starting-point screen of a screen transition triggered by pressing of the PS button 236. This information indicates a screen to which to make a backward transition by pressing operation on the PS button 236 again, and may be, for example, the identification information on any one of a home screen, a browser screen, or a game screen. The related information storing unit 258 stores content related information acquired by a related information acquiring unit 266, which will be described later, while associating the content related information with the ID of the content thereof.

The control unit 260 executes various types of data processing. More particularly, the control unit 260 controls the display of a navigation screen that supports selection of content to be played back (in other words, a menu screen for starting an application program), and also controls a transition between screens, according to the embodiment. A "menu" in the specification refers to a displayed object which works as a trigger to execute a predetermined function, and may be configured with various types of text, symbols, images, and a combination thereof. Hereinafter, a "menu" may also be referred to as an "item," an "icon," or a "symbol," as appropriate.

Figure 4:
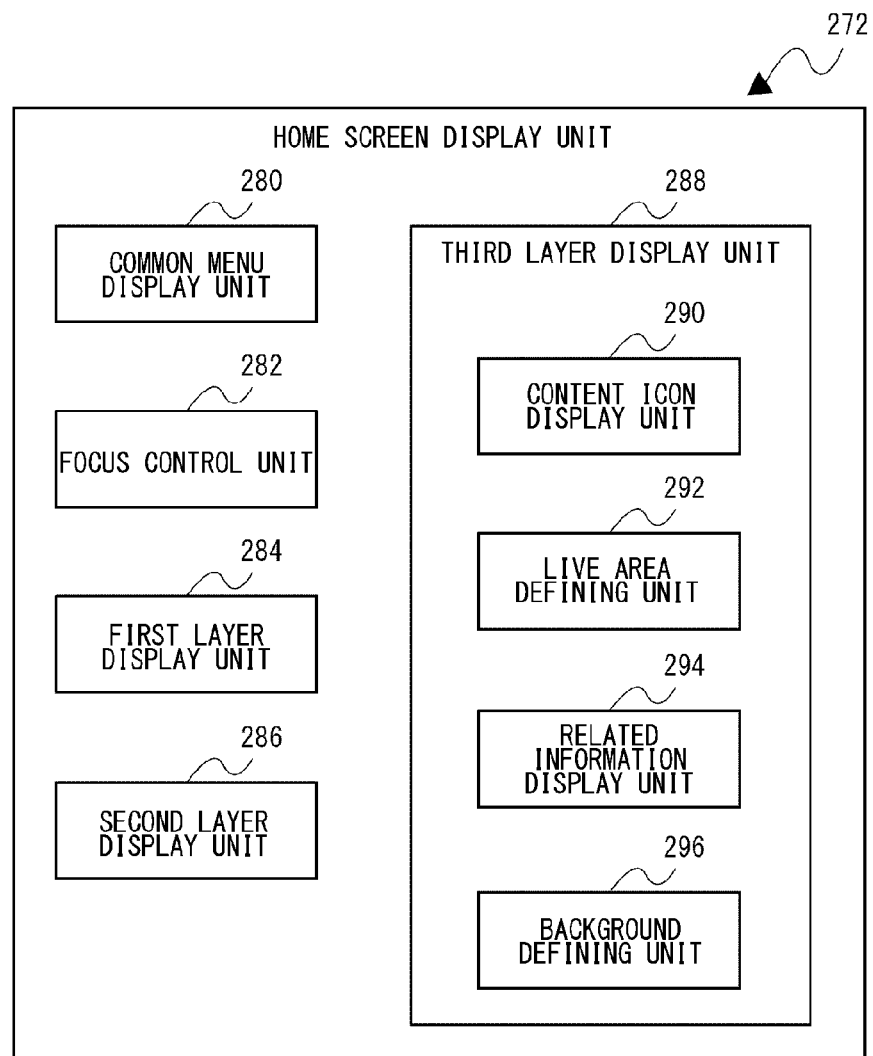
FIG. 4 shows the detailed configuration of the home screen display unit shown in FIG. 3.

The control unit 260 comprises an operation detecting unit 262, a screen transition control unit 264, a user information acquiring unit 265, a related information acquiring unit 266, a content playback unit 268, and a display control unit 270. The display control unit 270 includes a home screen display unit 272, a game screen display unit 274, and a browser screen display unit 276. FIG. 4 shows the detailed configuration of the home screen display unit 272 shown in FIG. 3. The home screen display unit 272 includes a common menu display unit 280, a focus control unit 282, a first layer display unit 284, a second layer display unit 286, and a third layer display unit 288. The third layer display unit 288 includes a content icon display unit 290, a live area defining unit 292, a related information display unit 294, and a background defining unit 296.

An explanation will be continued while referring back to FIG. 3. The operation detecting unit 262 detects, via the communication processing unit 250, an operation input by a user through a controller 202. The user information acquiring unit 265 transmits a request to provide user information to the managing server 102, and acquires, as a response from the managing server 102, user information stored in the managing server 102. The related information acquiring unit 266 transmits a request to provide content related information to the managing server 102, and acquires, as a response from the managing server 102, content related information stored in the managing server 102.

The content playback unit 268 reads data of content that is instructed to be played back in a content zone screen, which will be described later, from the content data storing unit 254, plays back the content, and passes the result of the playback (an image or the like) to the game screen display unit 274. In addition, the content playback unit 268 updates playback histories of content stored in the content data storing unit 254 by storing an identification information indicating content that has been played back in the content data storing unit 254. The playback status notifying unit 269 in the content playback unit 268 notifies the managing server 102 of the playback status of content (e.g., the name of a game being played back, the progress status of a game, the status of a player's character, etc).

The display control unit 270 outputs data of a home screen, a browser screen, a game screen as a user interface provided by the game console 200 to the television monitor 204 via a display driver, and displays these screens on the television monitor 204. The display control unit 270 executes a process of display switching from a screen being displayed to another screen in accordance with an instruction for screen transition instructed by the screen transition control unit 264.

The home screen display unit 272 in the display control unit 270 controls the display of a home screen, the game screen display unit 274 controls details of a game screen to be displayed, and the browser screen display unit 276 controls details of a browser screen to be displayed. The home screen display unit 272, the game screen display unit 274, and the browser screen display unit 276 store data of a home screen, a game screen, and a browser screen that have been displayed recently, or that are the latest in storage areas for respective screens provided in the screen data storing unit 256, and updates the data on an as needed basis. This storing and updating process is continuously executed even during a period when a screen is not displayed on the television monitor 204 (i.e., when the screen is created and updated in the background).

The screen transition control unit 264 controls screen transitions among a home screen, a browser screen, and a game screen. For example, the screen transition control unit 264 controls a switch between these screens, and a switch between home screens that belong to different layers. Detailed explanations will be given below on a home screen, a browser screen, and a game screen, respectively, and a further explanation will be given on a transition between these screens.

[Home Screen] A home screen is a portal screen for processing content. The home screen may be referred to as a navigation screen that guides a user until the determination of content to be processed in the game console 200 and that supports a user's determination of content to be processed. Further, a home screen may be referred to as a menu screen that presents a plurality of menus (i.e., options) to a user and that guides the user to the playback of content by allowing the user to select a desired menu one by one.

Figure 5:
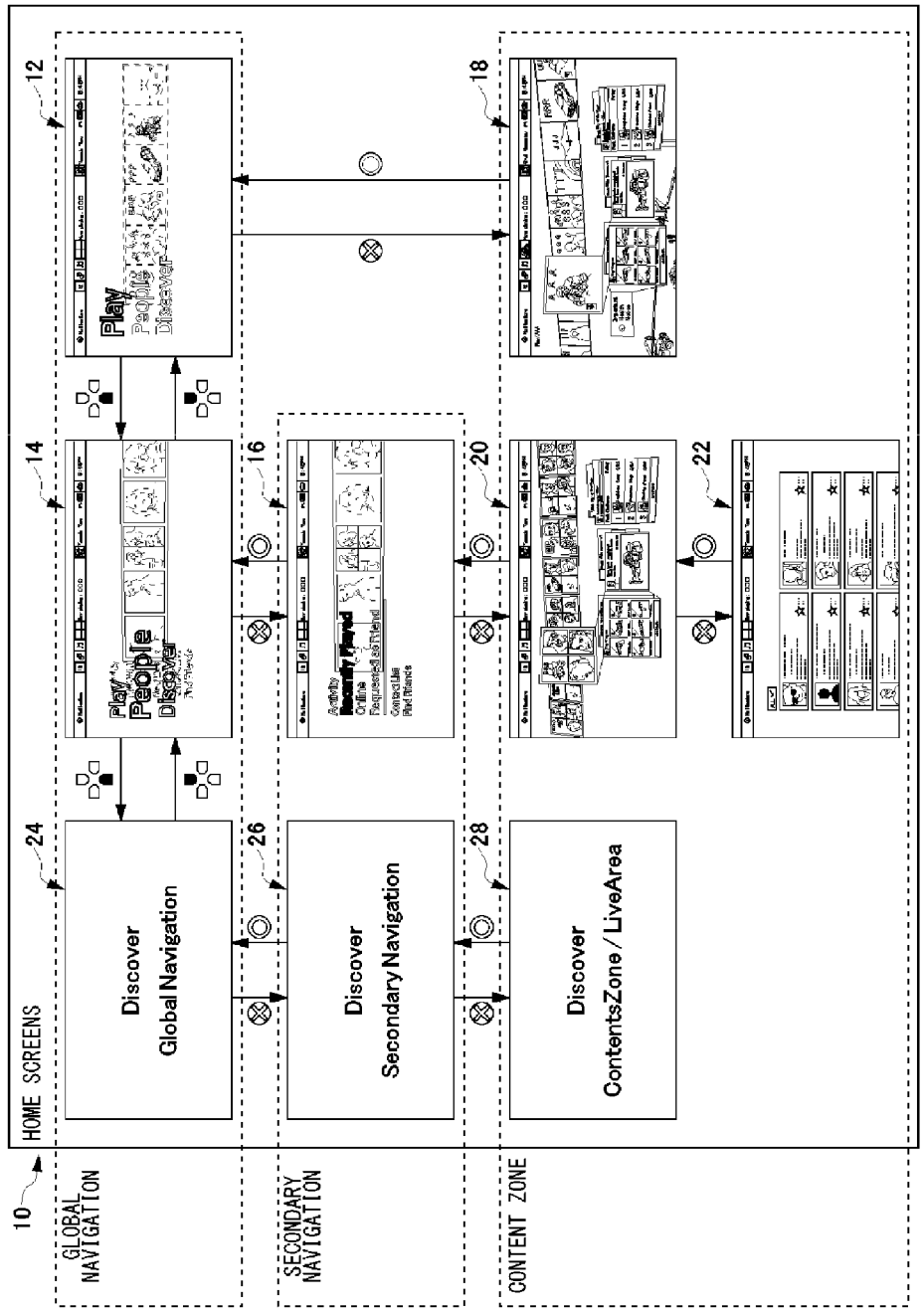
FIG. 5 schematically shows a hierarchy of home screens and screen transitions among the home screens.

FIG. 5 schematically shows a hierarchy of home screens and screen transitions among the home screens. Home screens 10 are grouped into a plurality of layers so that a user can comfortably select a desired function and desired content from among a large number of functions and pieces of content provided by the game console 200, and so that the provision of diverse functions and a simple user interface are compatible. According to the embodiment, the home screens 10 are classified into three layers, and a user selects desired content while making a transition between screens belonging to respective layers.

A screen of a first layer that is located on the upper layer with respect to a screen transition is referred to as a "global navigation screen." A screen of a second layer that is located on the middle layer with respect to a screen transition is referred to as a "secondary navigation screen." A screen of a third layer that is located on the lower layer with respect to a screen transition is referred to as a "content zone screen." Herein after, a global navigation screen, a secondary navigation screen, and a content zone screen are referred to as a "home screen 10" in case of being referred to collectively. While a home screen 10 is displayed, if a category and/or a condition is selected by using the direction key 216 and if the cross button 226 is pressed as a determination operation, the screen transition control unit 264 makes a transition to a home screens 10 of a lower layer, one by one. On the other hand, if the circle button 224 is pressed as a cancellation operation, the screen transition control unit 264 makes a transition to a home screens 10 of an upper layer, one by one.

A global navigation screen is a screen for allowing a user to select a category of content to be processed, and is an initial screen that is displayed when the game console 200 is started. A content zone screen is a screen for allowing a user to select content to be processed from among a plurality of pieces of content that have been associated, in advance, with a category selected in the global navigation screen. A secondary navigation screen is a screen for allowing a user to select a condition of content to be displayed in a content zone screen with a high priority, the content being included in a plurality of pieces of content that have been associated with a category selected in the global navigation screen. This condition may also be referred to as a filtering condition for displaying content in a content zone screen.

Figure 6:
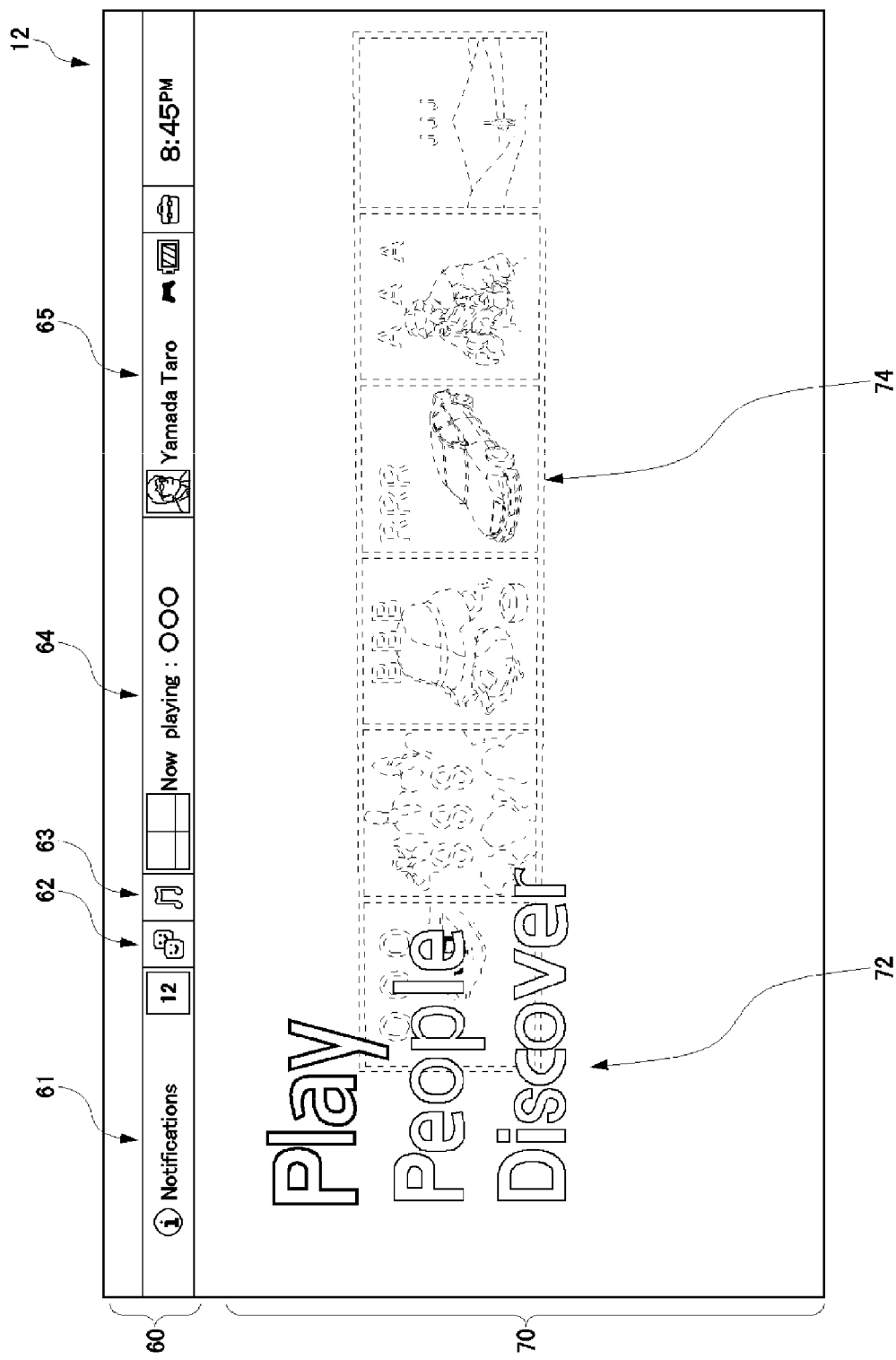
FIG. 6 shows a global navigation screen.
Figure 7:
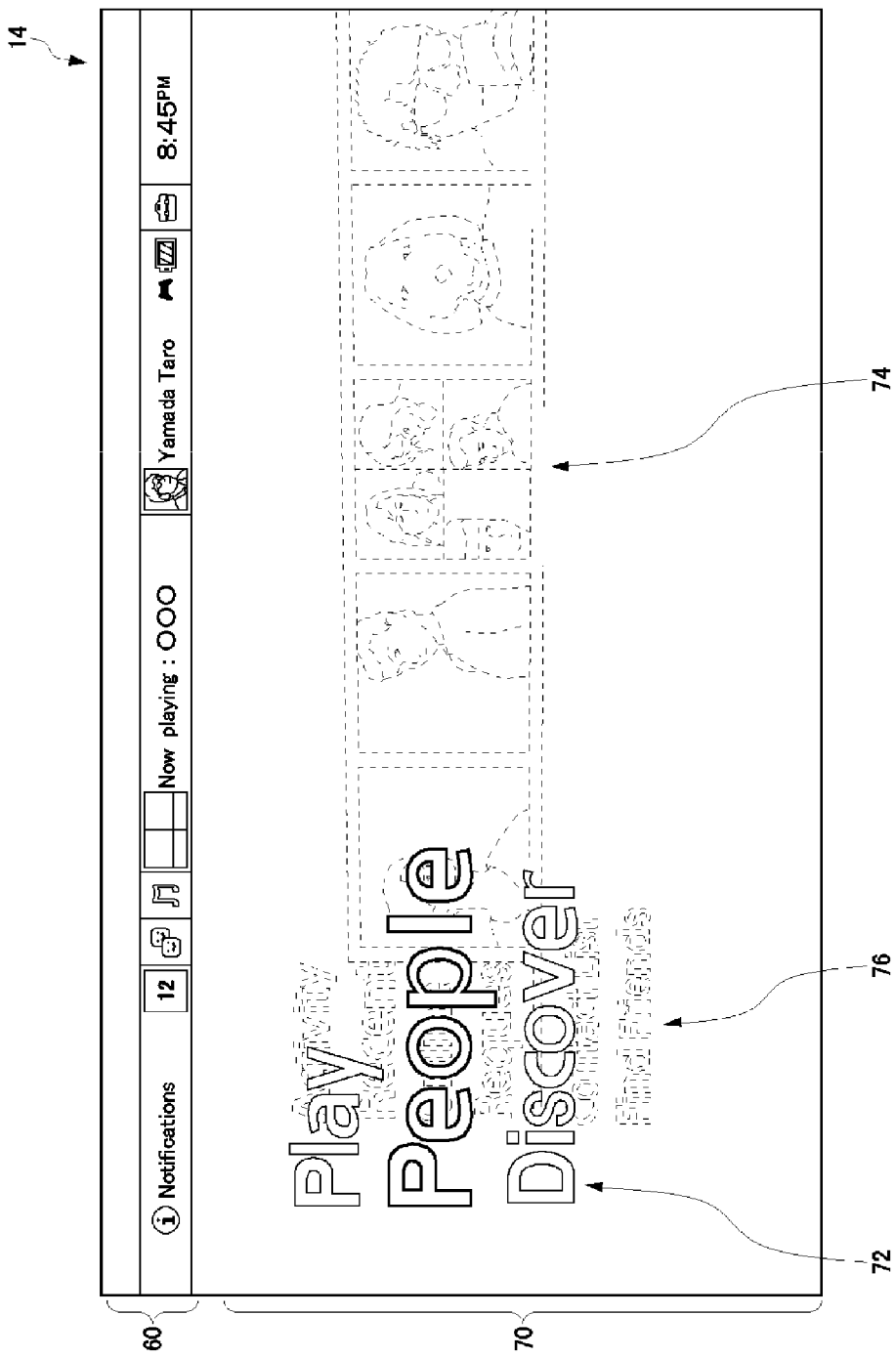
FIG. 7 shows a global navigation screen.

FIG. 6 shows a global navigation screen 12 shown in FIG. 5 and FIG. 7 shows a global navigation screen 14 shown in FIG. 5. The first layer display unit 284 displays a global navigation screen, and displays a plurality of menus 72 in a respective-layers-information area 70 of the global navigation screen. The plurality of menus 72 indicate a plurality of categories of electronic content to be processed, respectively. A "Play" category is deemed as a place to enjoy content. More specifically, a "Play" category is a category where electronic content is played back. A "People" category is deemed as a place to connect with a friend and/or with a player around the user. More specifically, a "People" category is a category where information on other users is viewed as electronic content. A "Discover" category is deemed as a place to discover a new and enjoyable experience. More specifically, a "Discover" category is a category where a user view information on electronic content that the user has not yet experienced.

The first layer display unit 284 displays at least a portion of the display of a screen image of a lower layer (i.e., a secondary navigation screen and a content zone screen) with image quality lower than that in the case where the screen image is actually displayed in the lower layer. For example, an image of at least a portion included in a screen of a lower layer may be displayed blurry by eliminating high frequency components by using a low pass filter, a Gaussian filter, or the like. Displaying in low quality includes all sorts of visibility reduction compared to that of an actual image displayed in a screen of a lower layer. For example, an image may be displayed in a small size, may be displayed with a low resolution, or may be displayed with a high degree of transparency.

In FIG. 6, with respect to a content image to be displayed in a content zone screen 18, which is a transition destination in case the "Play" category is selected, a content image 74 is displayed. The content image 74 is a low-quality image of the content image to be displayed in the content zone screen 18. In FIG. 7, with respect to a menu to be displayed in a secondary navigation screen 16, which is a direct transition destination in case the "People" category is selected, a menu 76 is displayed. The menu 76 is a low-quality image of the menu to be displayed in a secondary navigation screen 16. In FIG. 7, with respect to a content image to be displayed in a content zone screen 20, which is an indirect transition destination in case the "People" category is selected, a content image 74 is further displayed. The content image 74 is a low-quality image of the content image to be displayed in the content zone screen 20.

The first layer display unit 284 may adjust the level of image quality reduction in accordance with a distance between screens, that is, in accordance with the number of screen transitions required in order to arrive at a specific screen. For example, since the menu 76 of the global navigation screen 14 is an image of the secondary navigation screen 16 of distance 1 (one transition), the image quality of the menu 76 may be reduced by one level. On the other hand, since the content image 74 of the global navigation screen 14 is an image of the content zone screen 20 of distance 2 (two transitions), the image quality of the content image 74 may be reduced by two levels (i.e., the image quality of the content image 74 may be reduced more than that of the menu 76.)

That is, the first layer display unit 284 may display an image of the secondary navigation screen 16 with comparatively high image quality while displaying both an image of the secondary navigation screen 16 and an image of the content zone screen 20 with image quality lower than that of actual images thereof. In this manner, by displaying in an upper-layer screen an image of a lower screen, which is distant from the upper-layer screen, with relatively low image quality, and by displaying an image of a middle-layer screen, which is close to the upper-layer screen, with relatively high image quality, a hint of a distance between screens can be given to a user. Further, this allows a user to grasp intuitively the hierarchy of home screens 10 and screen images to be displayed in the future.

The common menu display unit 280 displays, in a system area 60, a plurality of menus for specifying an operation that does not depend on layers of screen transitions (herein after also referred to as "common menus"). The system area 60 is provided at a same position in any of a global navigation screen, a secondary navigation screen, or a content zone screen. The common menu display unit 280 arranges and displays each of the plurality of common menus at a same position in the system area 60 regardless of the type of the screens. In other words, the common menu display unit 280 arranges and displays the common menus in a same order.

The common menus includes a notifications 61, a chat 62, a BGM setting 63, an item on playback 64, and a login user 65. Although not shown in FIG. 5, if the cross button 226 is pressed for a home screen where a certain common menu is focused on, the screen transition control unit 264 allows a transition to a screen with which the focused common menu is associated.

The item on playback 64 included in the common menus indicates content being played back in the background while a home screen 10 is displayed. For example, the item on playback 64 includes the name of a game being played back and a thumbnail thereof. Typically, in case that a user switches from a play back screen (i.e., a game screen) to a home screen 10 while continuing the play back of content, the common menu display unit 280 displays the item on playback 64 in the home screen 10 after the switch. As will be described later, the item on playback 64 provides a shortcut function for taking a shortcut to a playback screen. The common menu display unit 280 may display a thumbnail of a reduced-size image or video indicating a current (latest) playback result of content being played back in the background as a thumbnail of the item on playback 64.

The focus control unit 282 controls the focus status (i.e., selection status) of menus arranged in a home screen 10 in accordance with an operation to the direction keys 216 by a user. FIG. 6 shows a status where the "Play" category is focused on, and FIG. 7 shows a status where the "People" category is focused on. For example, an operation in the down direction is input in the global navigation screen 12 shown in FIG. 6, the global navigation screen 12 is replaced with the global navigation screen 14 shown in FIG. 7. In this manner, the first layer display unit 284 is triggered by a change of the status of the menu 72 to the focused status so as to display a screen image of a lower layer with low image quality. In other words, before a determination operation for a focused menu is made, a hint of a post-transition screen image, which will be displayed if the determination operation is performed, is given to a user.

An operation in the up direction is input in the global navigation screen 12 shown in FIG. 6, the focus control unit 282 changes the status of a predetermined common menu (e.g., a notifications 61) in the system area 60 to the focused status. If an operation in the horizontal direction is input in this status, the focus control unit 282 switches statuses so that another common menu is set in the focused status. The focus control unit 282 may display a cursor in order to indicate that a specific menu is in a focused status.

As shown in FIG. 5, if the cross button 226 is pressed for the global navigation screen 12 where the "Play" category is focused on, the screen transition control unit 264 allows a direct transition to the content zone screen 18 of the third layer. On the other hand, if the cross button 226 is pressed for the global navigation screen 14 where the "People" category is focused on, the screen transition control unit 264 allows a transition to the secondary navigation screen 16 of the second layer. If the cross button 226 is pressed in a state where a certain condition is focused on in the secondary navigation screen 16, the screen transition control unit 264 allows a transition to the content zone screen 20 of the third layer.

If the cross button 226 is pressed for the global navigation screen 24 where the "Discover" category is focused on, the screen transition control unit 264 may allow a transition in a similar manner as that of the case of "People" category. For example, the screen transition control unit 264 may allow a transition to a secondary navigation screen 26, and to a content zone screen 28, sequentially. The secondary navigation screen 26 is used in order to define conditions for narrowing down content that the user has not yet experienced, for example, content that the user has not yet purchased, and/or content that the user does not have a right to play back. The content zone screen 28 is used for selecting content of which detailed information is to be viewed.

Figure 8:
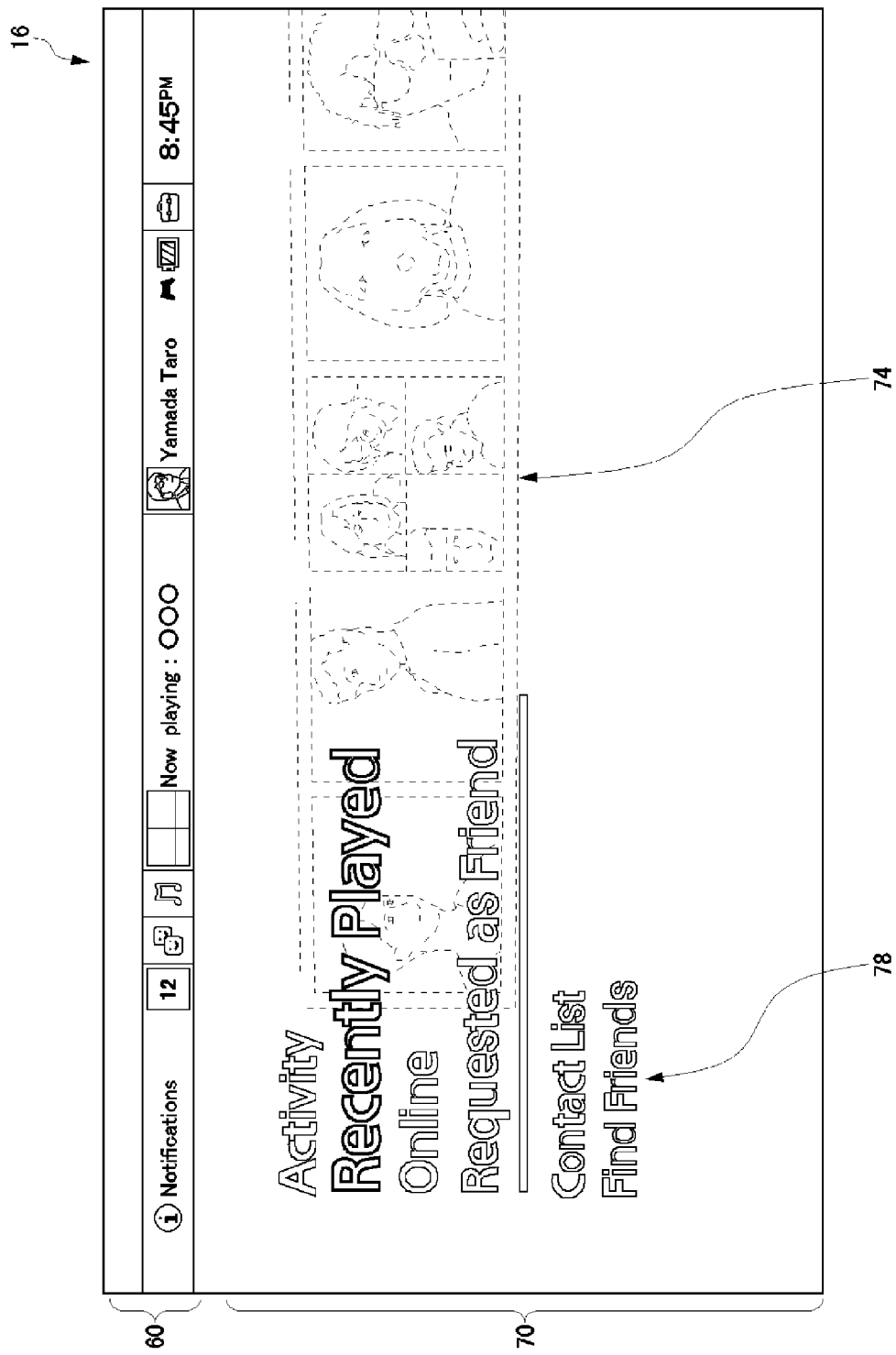
FIG. 8 shows a secondary navigation screen.

FIG. 8 shows the secondary navigation screen 16 shown in FIG. 5. The second layer display unit 286 displays a secondary navigation screen, and displays a plurality of menus 78 in a respective-layers-information area 70 of the secondary navigation screen. The plurality of menus 78 indicate filtering condition of content. For example, a "Recently Played" condition may be a condition specifying that content having new playback date and time by a user and a friend user associated with the content are displayed in the content zone screen 20 with a high priority. An "Online" condition may be a condition specifying that a friend user in an on-line status (i.e., a friend user whose game console 200 is currently connected with the managing server 102) is displayed in the content zone screen 20 with a high priority.

The second layer display unit 286 displays, in the secondary navigation screen 16, an image of at least a portion of the content zone screen 20 with image quality lower than that in the case where the image is actually displayed in the content zone screen 20. On the other hand, the second layer display unit 286 displays the image with image quality higher than that of the case where the image is displayed in the global navigation screen 14. Displaying in high quality includes all sorts of displaying with higher visibility. For example, an image may be displayed in a large size, may be displayed with a high resolution, or may be displayed with a low degree of transparency. With respect to a content image to be displayed in a content zone screen 20, which is a transition destination in case the "Recently Played" condition is selected, a content image 74 is displayed in FIG. 8. The content image 74 is a low-quality image of the content image to be displayed in the content zone screen 20. The content image 74 shown in FIG. 8 is displayed with image quality higher than that of the content image 74 shown in FIG. 7.

Subsequently, an explanation will be given on a content zone screen of the third layer of home screens 10. First, an explanation will be given on a case where the "Play" category is selected in the global navigation screen.

Figure 9:
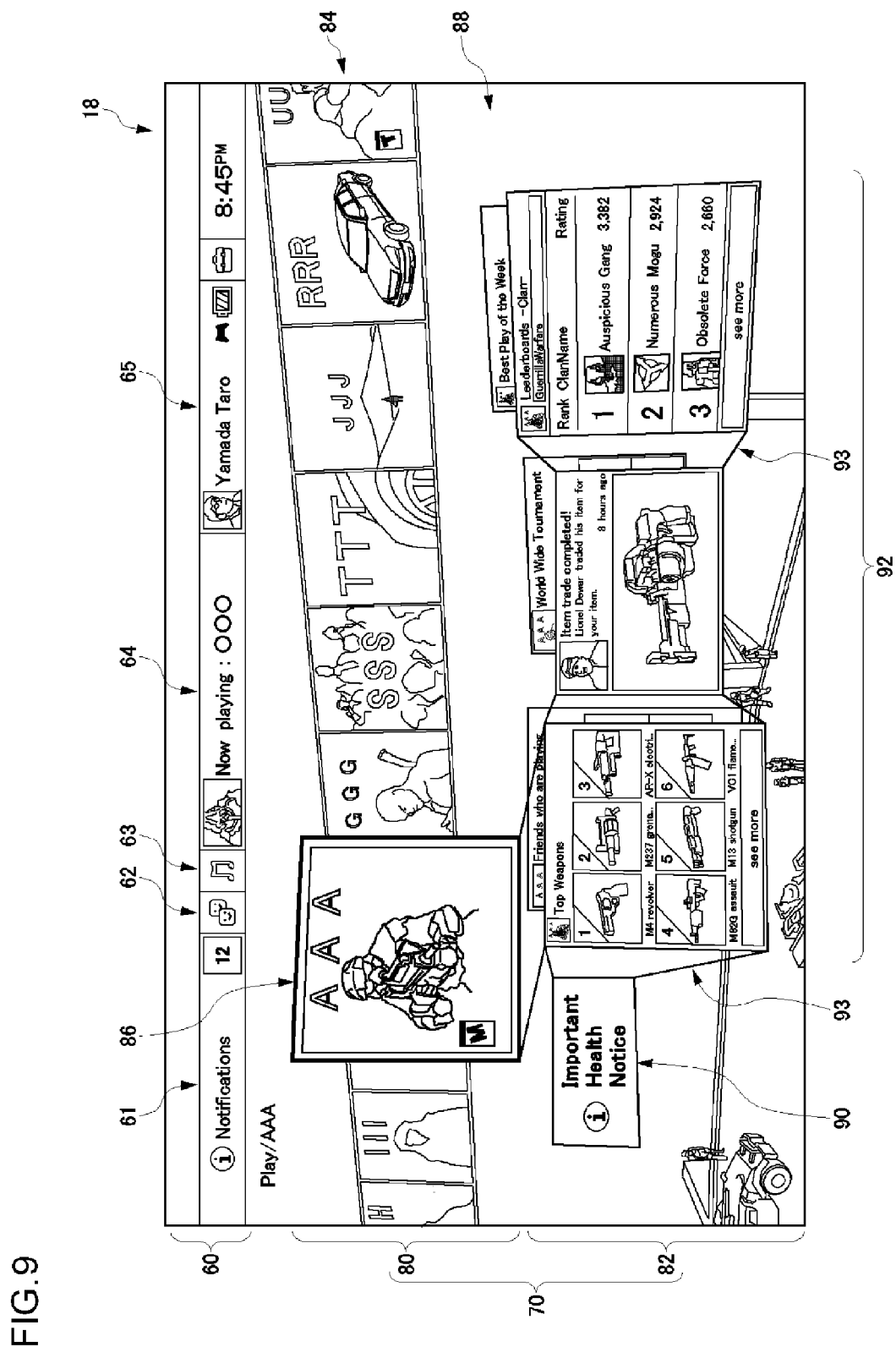
FIG. 9 shows a content zone screen.

In this case, the third layer display unit 288 displays the content zone screen 18 shown in FIG. 5. FIG. 9 shows the content zone screen 18 shown in FIG. 5. In the content zone screen 18, the respective-layers-information area 70 is divided into a content area 80 and a live area 82. The content icon display unit 290 arranges in a line a plurality of content icons 84 associated with a plurality of pieces of content that can be played back in the game console 200 respectively and displays the icons 84 in the content area 80.

The content icons 84 are thumbnails that graphically indicate information on respective content. The content icons 84 may be moving image thumbnails. The "content that can be played back" refer to content that a user of the game console 200 has a legitimate right to play back. For example, the "content that can be played back" includes content that the user purchased and installed on the game console 200, content of which the usage license is registered with an external server (the managing server 102 or the like), and the content being distributed freely from an external server (the managing server 102 or the like). In case that a user uses a subscription service where the playback of content (games, music, moving images, or the like) is permitted only during a predetermined licensed period, the "content that can be played back" further includes content with which a usage allowance has given and the licensed period thereof is not yet expired.

When the content zone screen 18 is to be displayed, the content icon display unit 290 refers to playback histories stored in the content data storing unit 254 and identifies the latest playback date and time for respective content. Then the content icon display unit 290 displays content icons 84 so that the newer the playback date and time of the content is, the higher the priority for displaying the icon 84 thereof is. More specifically, the content icon display unit 290 places the content icon 84 corresponding to content having the latest playback date and time in an initial state of the content zone screen 18 (i.e., immediately after a screen transition) at a focus position, which will be described later. From the icon thereof, the content icon display unit 290 arranges content icons 84 in descending order of playback date and time sequentially from left to right so as to display the plurality of content icons 84 in a line. At the initial state of the content zone screen 18, a content icon 84 corresponding to content having the oldest playback date and time may be displayed on the immediate left of the focus position.

Also in case that "Play" category is focused on in a global navigation screen, the content icon display unit 290 creates an image where a plurality of content icons 84 are arranged and passes the image to the first layer display unit 284. Thereby, the content image 74 is displayed in the global navigation screen as shown in FIG. 6.

The focus control unit 282 displays a cursor 86 at a predetermined fixed position in the content area 80 (herein after also referred to as a "focus position"). The content icon display unit 290 displays a content icon 84 that is to be displayed in the focus position as if the content icon 84 is focused on. Herein after, content of which the content icon 84 is displayed in the focus position is also referred to as "focused content." As described above, an icon of content having the latest playback date and time is displayed in the focus position immediately after a transition to the content zone screen 18. Therefore, the content having the latest playback date and time will be the first focused content.

If an operation indicating the left or right direction input through the direction key 216 is detected when a cursor 86 is in the content area 80, the content icon display unit 290 changes positions for displaying the plurality of content icons 84, and displays the content icons 84 so that the content icons 84 are shifted in the direction in accordance with the operation direction. On the other hand, the focus control unit 282 restrains the movement of the cursor 86. For example, if an operation indicating the right direction is detected, the content icon display unit 290 changes the positions for displaying the content icons 84 so that respective content icons 84 move to the left on the screen, and defines content that have been located on the right of the focus position until that moment as a new focused content.

In this manner, a focus position is fixed in the content area 80. Thus, if an operation for selecting content (an operation indicating the left or right direction through the direction key 216) is detected, the cursor 86 remains immovable at the focus position in the content area 80, and the content icons 84 moves. On the other hand, if an operation indicating the up or down direction is detected, the focus control unit 282 moves the cursor 86 from the focus position in the content area 80 to a common menu positioned in the up direction (e.g., directly above), or to the live item 92 placed at a position in the down direction (e.g., directly below). Therefore, regardless of whether or not an operation for changing focused content in the content area 80 is input, the focus control unit 282 moves the cursor 86 to a same common item or to a same live item 92 in accordance with an input operation indicating the up or down direction.

For example, an operation in the up direction is input in the content zone screen 18 shown in FIG. 9, the cursor 86 may always be moved to the BGM setting 63, regardless of the focused content at that time. In case of moving the cursor 86 in accordance with an input operation indicating the left or right direction to select the focused content, the position of the cursor 86 in the content area 80 changes. Therefore, the destination of the movement of the cursor 86 accompanying an operation indicating the up or down direction changes every time. Consequently, this may sometimes bring discomfort to a user, and/or may require different operations even in case of focusing on a same common menu. According to the embodiment, by fixing the position of the cursor 86 in the content area 80, and by fixing the destination of the movement of the cursor 86 accompanying an operation indicating the up or down direction, the deterioration of user friendliness in operation is restricted.

In case that the status of a specific piece of content changes to the focused status in the content area 80, the live area defining unit 292 sets the notification item 90 and a predetermined number (three according to the embodiment) of live items 92 in front of the live area 82. The live item 92 is a display region for displaying a various types of information relating to focused content, and may be deemed to be a display frame. The notification item 90 is static information determined fixedly to focused content. The notification item 90 is, for example, a link icon for displaying documents, such as an instructions manual, precautions, etc.

In case that the status of a specific piece of content changes to the focused status in the content area 80, the related information acquiring unit 266 acquires a plurality of types of related information summaries relating to the focused content from the managing server 102, associates the summaries with the ID of the focused content, and stores the summaries in the related information storing unit 258. The related information display unit 294 displays a predetermined number (three according to the embodiment) of types of related information summaries from among a plurality of types (for example, four to nine types) of related information summaries acquired by the related information acquiring unit 266. The related information display unit 294 displays the predetermined number of types of related information summaries in the three live items 92 located in front of the live area 82. For example, in case that a related information summary and the updated date and time thereof is acquired from the managing server 102, the related information display unit 294 may display three related information summaries having the latest updated date and time in the live item 92 in front of the live area 82.

Every time focused content is changed in the content area 80, the related information acquiring unit 266 acquires a related information summary for the new focused content. The related information display unit 294 displays the related information summary relating to the new focused content in the live item 92.

If a specific piece of content is focused on, and the cross button 226 is pushed, the content playback unit 268 starts the playback of the focused content. In other words, the content playback unit 268 does not start the playback of focused content when a specific piece of content is merely focused on in the content area 80. In the game console 200, while not starting the playback of focused content, the related information summary of the focused content is displayed on the television monitor 204, which supports a user with a selection of content to be played back.

If an operation in the down direction is input through the direction key 216 in the content zone screen 18 shown in FIG. 9, the focus control unit 282 moves the cursor 86 to one live item 92 among the three live items 92 displayed in the front. Then the focus control unit 282 changes the status of the live item 92 of the destination of the movement to the focused status. When the cursor 86 is in the live area 82, the focus control unit 282 moves the cursor 86 in the horizontal direction, by an operation in the horizontal direction input through the direction key 216, and changes the status of another live item 92 to the focused status. As will be described later, if a determination operation is performed while a specific live item 92 is focused on, a browser screen indicating detailed related information corresponding to related information summary in the focused status is displayed. In any of the cases that the cursor 86 is on one of the three live items 92 displayed in the front, if an operation in the up direction is input, the focus control unit 282 moves the cursor back to the focus position fixed in the content area 80.

Upon receiving various types of information (e.g., a notification on the progress status of a game, a comment that is newly posted, etc.) uploaded from respective game consoles 200, the managing server 102 updates a related information summary and detailed related information, which are content related information. The related information acquiring unit 266 acquires a related information summary of focused content regularly (every 30 seconds according to the embodiment) from the managing server 102.

Upon detecting that the related information summary newly acquired by the related information acquiring unit 266 and the related information summary stored in the related information storing unit 258 are different, the related information display unit 294 displays the related information summary newly acquired in stead of the related information summary having been displayed until that moment in the live item 92. That is, upon detecting that the related information summary of focused content is updated, the related information display unit 294 switches information displayed in the live item 92 from the related information summary before the update to the related information summary after the update.

In case that the number of related information summaries acquired by the related information acquiring unit 266 is more than three, the live area defining unit 292 sets a live item 92 for displaying an excess of related information summaries (herein after also referred to as a "second live item group") in the back of the live items 92 displayed in the front of the live area 82 (herein after also referred to as a "first live item group"). The "front" may be deemed to be a position close to a user when viewed from the user in terms of the appearance of the content zone screen 18, and the "back" may be deemed to be a position far from the user when viewed from the user.

The live area defining unit 292 sets the first live item group while superimposing the first live item group on the second live item group. However, the live area defining unit 292 does not allow the first live item group and the second live item group to overlap one another completely. In other words, the live area defining unit 292 determines the position of each live item so that the first live item group is displayed so as to be superimposed on a portion of the second live item group. In yet other words, the live area defining unit 292 determines the position of the second live item group so that the second live item group is hidden by the first live item group, while a portion of the second live item group is exposed. The related information display unit 294 displays three related information summaries from among a plurality of types of related information summaries in the front live item 92, and displays the rest of the related information summaries in the live items 92 that is set in the back. Thereby, under the limitation of screen size, while increasing the visibility of a part of the related information, a hint is given to a user about the existence of related information other than the related information displayed in the front.

In case that a predetermined switch condition is satisfied, the related information display unit 294 makes a switch so that a related information summary having been displayed in the live item 92 in the back until that moment is displayed in the live item 92 in the front. In the game console 200, a relation between a live item 92 as a display frame and a related information summary is not fixed, and one related information summary is displayed in live items 92 at various positions as time passes.

More specifically, for each of the plurality of types of related information summaries, the related information display unit 294 stores, in the related information storing unit 258, a display start time for displaying each related information in the live item 92 in front of the live area 82. The related information display unit 294 detects a related information summary (herein after referred to as a "first summary") for which the display time in the front live item 92 reaches a predetermined time period (according to the embodiment, 15 seconds). In this process, the related information display unit 294 identifies a related information summary having the oldest display start time in the front from among the plurality of types of related information summaries (herein after referred to as a "second summary"), typically, another related information summary being displayed in the background live item 92. Then the related information display unit 294 exchanges the display positions of the first summary and the second summary. For example, the second summary is transcribed to a front live item 92 where the first summary has been displayed until that moment. On the other hand, the first summary is transcribed to a back live item 92 where the second summary has been displayed until that moment.

Upon detecting an update of a related information summary that has been displayed in the back live item 92, the related information display unit 294 may display the related information summary in the front live item 92 with a priority higher than that of other related information summary that has been displayed in the back live item 92 concurrently with the updated related information summary.

For example, even if another related information summary having been displayed in the back live item 92 has an older display start time in the front, the related information display unit 294 may display the updated related information summary with a high priority in the front live item 92. In case that an update of a related information summary having been displayed in the back live item 92 is detected, regardless of the display-in-the-front time of related information summaries having been displayed in the front live item 92 until that moment, the related information display unit 294 may instantly display the updated related information summary in the front live item 92.

Upon detecting an update of a related information summary having been displayed in the front live item 92, the related information display unit 294 may replace the related information summary that has been displayed until that moment with the updated related information summary. In this process, the related information display unit 294 may display the latest related information summary that has been updated for a predetermined time period (15 seconds) by resetting the display start time to the current time.

In case that the status of a specific piece of content changes to the focused status in the content area 80, the background defining unit 296 acquires a background image associated with the focused content from the content data storing unit 254, and displays the image on the background 88 of the content zone screen 18. Every time focused content is changed in the content area 80, the background defining unit 296 acquires a background image of new focused content, and makes a switch so that the background image of the new focused content is displayed on the background 88. Alternatively, the related information acquiring unit 266 may acquire a background image of focused content from the managing server 102.

An explanation will be given on the design (i.e., the feature of the appearance) of the content zone screen 18. In the content zone screen 18, an item to be operated (in other words, an item that can be operated) is displayed so as to be placed on a layer close to a user when viewed from the user, and an item not to be operated is displayed so as to be placed on a layer far from the user when viewed from the user.

More specifically, the content icon display unit 290 displays a content icon 84, which is specified by the cursor 86 in the focus position, in a size larger and with lightness higher than other content icons 84 so as to indicate that the content icon 84 is in a focused status. This presents a content icon 84 in the focus position, of which the related information is displayed in a live item 92, (i.e., the icon of focused content) as if being located at a position nearer to a user than other content icons 84.

The content icon display unit 290 displays content icons 84 so that the further in the right direction from the focus position a content icon 84 is placed, the lower the lightness of the content icon 84 is. This gives an expression as if the focused content is spotlighted so that the further a position is from the focused content, the darker the position is since the spotlights are difficult to reach the position. That is, a user is suggested that the playback dates and times of content gradually become older with the distance from the focus position. The content icon display unit 290 displays the content icon 84 placed on the left of the focus position with lightness still lower than other content icons. This gives an expression that the spotlights are blocked by the focused content and can not reach.

The live area defining unit 292 displays live items 92 to be displayed in the front of the live area 82 (a first live item group) with a predetermined degree of transparency by using a known method, such as alpha blending or the like. At the same time, the live area defining unit 292 displays live items 92 to be displayed in the front of the live area 82 (the first live item group) in a size larger and lightness higher than that of live items 92 to be displayed in the back (a second live item group). This provides a user with an indication that a related information summary displayed in the front of the live area 82 can be operated currently (i.e., the details thereof can be displayed in the browser screen) while providing a user with an indicating of the existence of information other than the related information summary displayed in the front. The live area defining unit 292 displays the content icon 84 of focused content (the cursor 86), three live items 92 to be displayed in front of the live area 82, and the notification item 90 in a manner where the icon and items are connected by line objects 93. This allows a presentation of linkage between a plurality of items that can be operated currently (in other words, relationships between items that are to be focused one by one in accordance with directional operations) in an easy-to-understand manner for a user.

The common menu display unit 280 displays the common menus in the system area 60 in the lightness same as that of the focused content and that of the live item 92 (related information summary) displayed in the front. This represents that the common menus are positioned in the front of a screen and gives a user a hint that the common menus can be operated.

Next, an explanation will be given on the display of the content related information as a list. When a cursor 86 is in the live area 82 in the content zone screen 18 shown in FIG. 9, that is, when an item in the live area 82 is focused on, if an operation indicating the down direction is detected, the content icon display unit 290 sets the mode of the content icon 84 as a non-display mode. The live area defining unit 292 enlarges the live area 82, and arranges a large number of live items 92, the number being larger than the number thereof until that moment, in a lattice across the entirety of the respective-layers-information area 70 including the content area 80 having been displayed until that moment. The related information display unit 294 displays both the related information summary having been displayed in the front live item 92 until that moment, and the related information summary having been displayed in the back live item 92 until that moment, in a plurality of live items 92, respectively. That is, the related information display unit 294 displays a plurality of types of related information summaries on a same layer. As a result, the content zone screen 18 shown in FIG. 10 is displayed.

Figure 10:
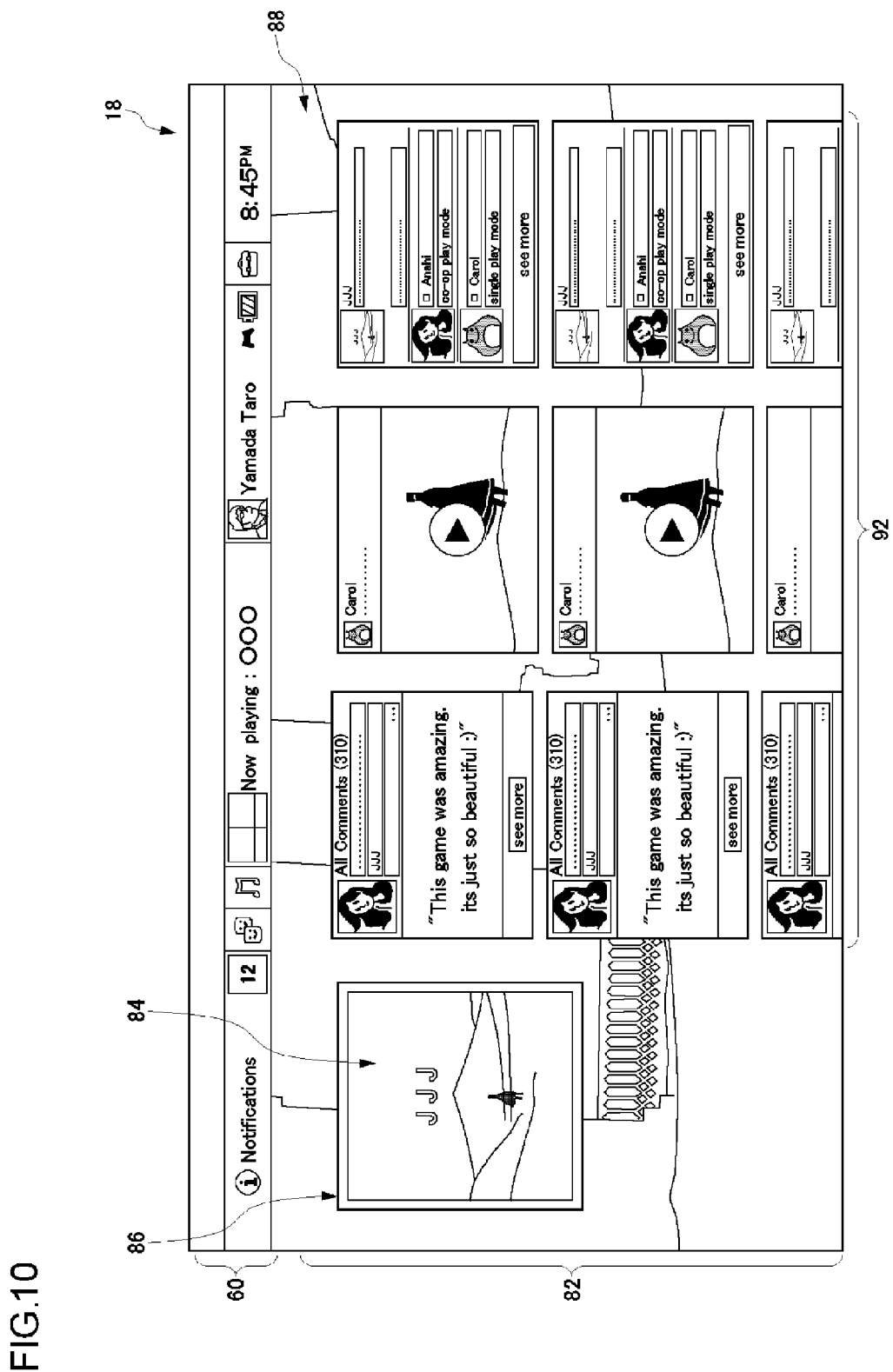
FIG. 10 shows a content zone screen.

FIG. 10 shows a status where a plurality of types of related information summaries relating to focused content is displayed as a list. More specifically, FIG. 10 shows a status where a plurality of types of related information summaries are arranged in a lattice and displayed as a grid. Although in FIG. 10, nine (three in the horizontal and three in the vertical) live items 92 are arranged, the live area defining unit 292 may display live items 92, the number of which is in agreement with the total number (the number of types) of the related information summaries relating to focused content, concurrently in a screen. In this way, the live items 92, of which the number is more than that of the live items 92 until that moment are concurrently displayed in the front of the screen. This allows a user to grasp the details of various types of related information summaries in a short time period, and also allows a user to easily compare respective summaries.

Although same information is displayed in different live items 92 in FIG. 10, different types of related information summaries are displayed in practice. In FIG. 10, focused content indicated by an content icon 84 specified by the cursor 86 is changed from that shown in FIG. 9, and the background 88 is also changed in accordance therewith.

The focus control unit 282 moves the cursor 86 between live items 92 in accordance with an operation of the direction keys 216, also in the content zone screen 18 shown in FIG. 10. If the live item 92 on the top layer is focused on by the cursor 86 and an operation in the up direction is input, displaying of the plurality of related information summaries as a list is finished and the display mode is changed back to that of the content zone screen 18 shown in FIG. 9.

In case of making a transition from the screen shown in FIG. 9 to the screen shown in FIG. 10, the related information display unit 294 may display three pieces of content related information, which are being displayed in the live items 92 disposed in front of the live area 82 in FIG. 9, in the three live items 92 disposed at the top of the screen shown in FIG. 10. In case of returning from the screen shown in FIG. 10 to the screen shown in FIG. 9, the related information display unit 294 may display three pieces of content related information, which are being displayed in three live items 92 disposed at the top of the screen shown in FIG. 10, in the three live items 92 disposed in front of the live area 82 in FIG. 9. This allows a user to easily grasp the links among screens intuitively.

Subsequently, an explanation will be given on a case where the "People" category is selected in the global navigation screen. In this case, as described above, the secondary navigation screen 16 is displayed once. In case that a specific filtering condition is selected in the secondary navigation screen 16, the third layer display unit 288 displays the content zone screen 20 shown in FIG. 5.

In a content zone screen corresponding to the "People" category (the content zone screen 20 and the content zone screen 22 shown in FIG. 5), information on another user who has been registered in the managing server 102 is displayed. According to the embodiment, the "another user" refers to a "friend user" who is registered in the managing server 102 by the user of the game console 200 in advance. When the content zone screen 20 and the content zone screen 22 are to be displayed, the user information acquiring unit 265 acquires various types of attributes of a friend user, for example, a photograph, a name, self-introduction, or the like that the friend user has registered in the managing server 102 in advance.

FIG. 11 shows the content zone screen 20 shown in FIG. 5. The content zone screen 20 is displayed in case that the "Recently Played" category is selected in the secondary navigation screen 16. When the content zone screen 20 is to be displayed, the content icon display unit 290 arranges in a line a plurality of content icons 84 and displays an image thereof in the content area 80 in a similar manner as that of the content zone screen 18 as described above.

The inner portion of each content icon 84 in a content zone screen 20 is divided into four. The content icon display unit 290 displays a thumbnail (content image 94) of content which a user played back in the past at the upper left area in one content icon 84. In other areas, the content icon display unit 290 displays images of friend users (user images 96) extracted, on the basis of a predetermined condition, from among friend users relating to the content at the upper left area. In FIG. 11, the content icon display unit 290 displays, in the other areas in the content icon 84, images of three users who are among the top three on the basis of a predetermined condition from among friend users who played back the content shown in the upper left area of the content icon 84.

An explanation will be given on an example of the ranking of friend users. In case where the "Recently Played" condition is selected in the secondary navigation screen 16, the managing server 102 or the content icon display unit 290 may determine the ranking of friend users who have played back the same piece of content as the one played back by the user in the past, so that the newer the playback date and time is, the higher the ranking of the friend user is. Alternatively, among friend users who have played back the same piece of content as the one played back by the user in the past, the ranking may be determined so that the more progressed the playback status of the content for a user is (e.g., the higher the target achievement rate in the game is), the higher the ranking of the user is.

In this manner, in the content zone screen 20, for each piece of content having been played back by the user in the past, the content and main users relating to the content are displayed while associated with each other. This allows the user of the game console 200 to easily grasp a correspondence relationship between content that have been played back by the user in the past and a friend user who is highly relevant to the content. This further allows a user to easily find a friend user who should be selected as a target for viewing the information, or a friend user with whom the user should have a dialog and/or contact (e.g., by sending a message, or the like). Thus, a rapport between users can be promoted.

In a similar manner as that of the content zone screen 18, the focus control unit 282 displays the cursor 86 at the predetermined focus position in the content area 80. The content icon display unit 290 displays information on a friend user with a high level of relevance to a filtering condition selected in the secondary navigation screen with a priority higher than that of information on a friend user with a low level of relevance to the filtering condition. In case the "Recently Played" condition is selected, the content icon display unit 290 places, at a focus position, the content icon 84 corresponding to content of the latest playback date and time in an initial state of the content zone screen 20, that is, immediately after a screen transition. From the icon thereof, the content icon display unit 290 arranges content icons 84 in descending order of playback date and time sequentially from left to right so as to display the plurality of content icons 84 in a line.

In a similar manner as that of the content zone screen 18, the content icon display unit 290 may display the content icon 84 at the focus position with high lightness and may display content icons 84 in the right so that the further in the right direction from the focus position a content icon 84 is placed, the lower the lightness of the content icon 84 is. The content icon display unit 290 may display the content icon 84 placed on the left of the focus position with lightness still lower than other content icons.

In a similar manner as that of the content zone screen 18, the related information acquiring unit 266 acquires from the managing server 102 a plurality of types of related information summaries of content indicated at the upper left area of focused content (i.e., focused content icon 84). The related information display unit 294 displays a plurality of types of related information summaries in a plurality of live items 92. The configuration for switching display positions between/among a plurality of types of related information summaries is also implemented in a similar manner as that of the content zone screen 18.

In this manner, in the content zone screen 20 of the "People" category for having contact with people, users are classified on content by content basis, and the latest related information on a focused content is displayed. This allows a user to easily find another user who should be selected as a target for viewing the information, or another user with whom the user should have a dialog and/or contact (e.g., by sending a message, etc.). Thus, a rapport between users can be promoted.

If the cross button 226 is pressed in a state where a specific content icon 84 is focused on in the content zone screen 20, the third layer display unit 288 displays the content zone screen 22 shown in FIG. 5. More specifically, the content icon display unit 290 finishes displaying the content icons 84 in a line shown in FIG. 11. Then the content icon display unit 290 displays a plurality of content icons indicating information on a plurality of friend users in the respective-layers-information area 70 in the content zone screen 22, in a lattice (for example, two in the horizontal direction by N in the vertical direction).

The content icon display unit 290 displays information on a friend user with a high level of relevance to a filtering condition selected in the secondary navigation screen with a priority higher than that of information on a friend user with a low level of relevance to the filtering condition. For example, in case the "Recently Played" condition is selected, the content icon display unit 290 information on friend users in content icons so that the newer the playback date and time when a friend user played back the content is, the upper in the content zone screen 22 the content icon for the information on the friend user is disposed.

Particularly in case of the transition from the content zone screen 20 shown in FIG. 11 to the content zone screen 22, the content icon display unit 290 displays information on friend users in content icons so that the newer the playback date and time when a friend user played back the content selected in the content zone screen 20 is, the upper in the content zone screen 22 the content icon for the information on the friend user is disposed. Thus, the three fiend users displayed in the content icon 84 focused on in the content zone screen 20 shown in FIG. 11 are to be displayed at the top of the content zone screen 22. In the content zone screen 22, a user can view information on a plurality of friend users sequentially by operating the direction key 216 in the up or down direction.

Also in case that the "People" category is focused on in a global navigation screen, the user information acquiring unit 265 acquires information on friend users. Then, the content icon display unit 290 creates an image where a plurality of content icons are arranged (for example, the image of lined content icons 84 shown in FIG. 11) and passes the image to the first layer display unit 284. Thereby, the content image 74 is displayed in the global navigation screen as shown in FIG. 7. In case that a specific filtering condition is focused on in the secondary navigation screen, the content icon display unit 290 creates an image where a plurality of content icons 84 are arranged in accordance with the focused filtering condition and passes the image to the second layer display unit 286. Thereby, the content image 74 is displayed in the secondary navigation screen as shown in FIG. 8.

[Browser Screen] A browser screen is a screen for detailed information relating to content (including not only multimedia playback content such as a game, music, or the like, but also other users) selected in the home screen 10.

FIG. 12 schematically shows images of browser screens 30 and screen transitions among the browser screens. If the cross button 226 is pressed in a state where a specific live item 92 is focused on in the content zone screen 18, the related information acquiring unit 266 acquires from the managing server 102 detailed related information corresponding to a related information summary displayed in the focused live item 92. In other words, the related information acquiring unit 266 acquires detailed related information on focused content in the content zone screen 18. The browser screen display unit 276 displays a browser screen 32 indicating the detailed related information acquired by the related information acquiring unit 266 on the television monitor 204 in full screen.

The detailed related information may be data on a web page (for example, structured document data in HTML, XML, or the like). The browser screen display unit 276 may pass data on detailed related information to a web browser program installed on the game console 200 and may display a browser screen 32 indicating a result of rendering by the web browser program.

If the cross button 226 is pressed in a state where a specific item (an icon, a link, or the like) is focused on in the browser screen 32, the related information acquiring unit 266 acquires information associated with the focused item from the managing server 102. The browser screen display unit 276 displays a browser screen 34 indicating information newly acquired by the related information acquiring unit 266. The information associated with the focused item may be information stored in the managing server 102 as further detailed related information on the focused content in the content zone screen 18.

If the cross button 226 is pressed in a state where a content icon 84 indicating a specific user is focused on in the content zone screen 22, the user information acquiring unit 265 acquires detailed user information on the focused user from the managing server 102. The browser screen display unit 276 displays a browser screen 36 indicating the detailed user information acquired by the user information acquiring unit 265 on the television monitor 204 in full screen. The detailed user information includes a photograph image, a playback status of content (the progress status of a game, or the like), a recent activity (an achieved target in a game, or the like), a moving image uploaded to the managing server 102, etc.

If the cross button 226 is pressed in a state where a specific item (an icon, a link, or the like) is focused on in the browser screen 36, the user information acquiring unit 265 acquires information corresponding to the focused item from the managing server 102. The browser screen display unit 276 displays a browser screen 46 indicating information newly acquired by the related information acquiring unit 266. The information corresponding to the focused item may be further detailed information on the friend user, for example, may be a micro blog relating to the user displayed in the browser screen 36 as shown in the browser screen 38 of FIG. 12.

Among browser screens, if an input determination operation is detected, a transition is made to the next browser screen, one step at a time. That is, every time the cross button 226 is pressed, a browser screen indicating information (detailed related information, detailed user information) on a layer that is one level deeper and one step further from the content zone screen is displayed. On the other hand, if an input cancellation operation is detected in a browser screen, a backward transition is made to a transition-starting-point screen one step at a time. That is, every time the circle button 224 is pressed, a browser screen indicating information on a layer that is one level shallower and one step nearer to the content zone screen is displayed. That is, a so-called historical back screen transition is performed.

FIG. 12 shows that if a determination operation is performed in the content zone screen 28, which corresponds to the "Discover" category in a global navigation screen, site information on an on-line store for purchasing content selected in the content zone screen 28 is displayed.

[Game Screen] If the cross button 226 is pressed in a state where a specific content icon 84 is focused on in the content zone screen 18, the content playback unit 268 starts playback of electronic content. For example, the content playback unit 268 starts the execution of a game application installed on the game console 200, and creates the display data thereof.

The game screen display unit 274 functions as a playback screen display unit and displays a screen that indicates results of playback/execution of content performed by the content playback unit 268 (referred to as a "game screen" according to the embodiment) on the television monitor 204 in full screen. It is needless to mention that a target to be played back by the content playback unit 268 may be various application data (music tunes, movies, etc) other than games, and a target to be displayed by the game screen display unit 274 may be playback/execution results of various application data.

[A Screen Transition] FIG. 13 schematically shows screen transitions among a home screen, a browser screen, and a game screen. As described above, the home screen display unit 272, the game screen display unit 274, and the browser screen display unit 276 store data of a screen that each unit has displayed recently or data of a screen that is the latest in a predetermined region in the screen data storing unit 256 and updates the data on an as needed basis.

If the cross button 226 is pressed in a state where a certain live item 92 is focused on in the content zone screen 18, the screen transition control unit 264 allows a transition from the content zone screen 18 to the browser screen 32. Also if the cross button 226 is pressed in a state where a live item 92 is focused on in the content zone screen 20 shown in FIG. 11, a transition is made in a similar manner. Among browser screens, every time the cross button 226 is pressed, information on a deeper layer is displayed, and every time the circle button 224 is pressed, a backward transition is made to an original display one by one, in a historical back manner. If the circle button 224 is pressed in the browser screen 32, the screen transition control unit 264 allows a transition from the browser screen 32 to the content zone screen 18.

If the cross button 226 is pressed in a state where a specific content icon 84 is focused on in the content zone screen 18, the screen transition control unit 264 allows a transition from the content zone screen 18 to the game screen 50. Although not shown in FIG. 13, if a user inputs an operation for stopping the playback of content in the game console 200 and the content playback unit 268 stops playback process, the screen transition control unit 264 allows a transition from the game screen 50 to the content zone screen 18.

Next, an explanation will be given on a screen transition triggered by an operation on the PS button 236.

In this embodiment, it is assumed that a browser screen 30 at a given distance from the home screen 10 (in other words, a browser screen 30 that can be reached from the home screen 10 by a given number of screen transitions) is being displayed. This browser screen 30 may be any one of the browser screen 32, the browser screen 34, the browser screen 36, or the browser screen 38 shown in FIG. 12, or may be a screen for displaying information on a further deep layer.

The PS button 236 functions as a short cut key for a screen transition. More specifically, if the PS button 236 is pressed once (i.e., single clicked) when the browser screen 30 is displayed, the screen transition control unit 264 allows a direct transition from the browser screen 30 to the content zone screen 18. In other words, the display of the browser screen 30 is switched directly to the display of the content zone screen 18 without displaying another browser screen 30 that is the transition starting point of the browser screen 30 currently displayed. In this process, the screen transition control unit 264 stores in the transition data storing unit 257 information indicating the browser screen 30 as a transition-starting-point screen of a transition caused by the PS button 236.

If the PS button 236 is single-clicked when the game screen 50 is displayed, the screen transition control unit 264 allows a transition from the game screen 50 to the content zone screen 18 while the content playback unit 268 continues the play back of content. In this process, the screen transition control unit 264 stores in the transition data storing unit 257 information indicating the game screen 50 as a transition-starting-point screen of a transition caused by the PS button 236.

If the PS button 236 is single-clicked in the content zone screen 18 that has been displayed by the single click of the PS button 236, or if the PS button 236 is single-clicked in another home screen 10 to which a transition is made from the content zone screen 18, the screen transition control unit 264 refers to the transition data storing unit 257 and specifies a transition destination. That is, the screen transition control unit 264 determines the transition-starting-point screen, where the PS button 236 has been single clicked most recently, as a transition destination screen of a transition triggered by a current single click of the PS button 236.

More specifically, if the transition starting point when the PS button 236 was single clicked most recently was the browser screen 30, the screen transition control unit 264 determines the browser screen 30 as the current transition destination. Alternatively, if the transition starting point when the PS button 236 was single clicked most recently was the game screen 50, the screen transition control unit 264 determines the game screen 50 as the current transition destination. If the browser screen 30 is determined as the transition destination, the browser screen display unit 276 displays the browser screen 30 that has been recently displayed and stored in the screen data storing unit 256. If the game screen 50 is determined as the transition destination, the game screen display unit 274 displays the latest game screen 50 that has been stored in the screen data storing unit 256.

In case that a transition from the game screen 50 to the home screen 10 is made by the PS button 236 during the play back of content, the content playback unit 268 or the game screen display unit 274 notifies the home screen display unit 272 of information indicating content of which the playback is to be continued in the background (a game ID or the like). The common menu display unit 280 in the home screen display unit 272 specifies a game title and a thumbnail on the basis of the notified information and displays an item on playback 64 (i.e., a "Now Playing" icon) in the system area 60 in the home screen 10. If the cross button 226 is pressed in a state where an item on playback 64 is focused on in the home screen 10, the screen transition control unit 264 allows a transition from the home screen 10 to the game screen 50. The game screen display unit 274 displays the latest game screen 50 that has been stored in the screen data storing unit 256.

Next, it is assumed that a transition has been made from the browser screen 30 to the content zone screen 18 by a single click on the PS button 236, and content to be played back has been selected in the content zone screen 18 and a transition has been made to the game screen 50. If the PS button 236 is pressed twice within a predetermined time period, which is determined to be a comparatively short term (i.e., double clicked) in this game screen 50, the screen transition control unit 264 determines the browser screen 30 as the current transition destination. The browser screen display unit 276 displays the browser screen 30 that has been displayed most recently and stored in the screen data storing unit 256.

Thereafter, it is assumed that the PS button 236 is double clicked again in a browser screen 30 to which a transition has made by the double click on the PS button 236, or in another browser screen 30 to which a transition is made from said browser screen 30. In this process, the screen transition control unit 264 determines the game screen 50 as the current transition destination. The game screen display unit 274 displays the latest game screen 50 that has been stored in the screen data storing unit 256. If the PS button 236 is further double clicked in the game screen 50, the browser screen 30 in which the PS button 236 has been double clicked most recently is displayed again. In this manner, in the game console 200, a double click on the PS button 236 allows a transition from a game screen 50 being displayed to a browser screen 30 that has been displayed most recently without displaying a home screen therebetween. Further, a direct transition from browser screen 30 being displayed to the latest game screen 50 is made.

If the PS button 236 is double clicked, the content playback unit 268 may continue playback process of content, or may suspend the process, or a developer of the content may determine arbitrarily and may set content data. In the former case, when returning back from the browser screen 30, the game screen display unit 274 may display the result of the playback that is latest at the time of returning. In the latter case, the game screen display unit 274 may return the display to the game screen at the time of a double click on the PS button 236 in the past. The same applies to the case where a screen transition is made between a game screen 50 and a home screen 10, the transition triggered by a single click on the PS button 236.

An explanation on the operation of the game console 200 with the aforementioned configuration will be given below. If a user starts the game console 200, the home screen display unit 272 displays a global navigation screen located on the top layer of home screens 10. If, in the global navigation screen, a user selects the "Play" category for playing back content, the screen transition control unit 264 allows a direct transition to a content zone screen. On the other hand, in the global navigation screen, if a user selects the "People" category for viewing the information relating to other users, the screen transition control unit 264 allows a transition to a content zone screen via a secondary navigation screen.

In a home screen located on an upper level, an image of a home screen located on a lower level (i.e., a home screen that can be a transition destination) is displayed. Thereby, the hierarchy of home screens can be easily grasped by a user intuitively. In other words, the position of a home screen currently being displayed among a plurality of hierarchized home screens can be easily grasped by a user. Further, hints on transition-destination screens that are the results of respective selections from among a plurality of menus are given to a user in advance when respective menus are focused on. This prevents a user from selecting a wrong menu against his/her intention. Namely, this helps a user to select an appropriate menu in the game console 200 where a plurality of home screens are hierarchized.

Further, this reduces operational mistakes by users by displaying an image of a home screen that can be a transition destination with low quality. For example, the global navigation screen 12 shown in FIG. 6 allows a user to understand intuitively that the content image 74 can not be operated. This prevents a user from inputting an invalid operation with respect to an image of a home screen that is be a transition destination, for example, from inputting an operation in the horizontal direction while the actual intention is to select the content image 74 in the global navigation screen 12.

In the secondary navigation screen 16 shown in FIG. 8, the content image 74 is displayed with image quality lower than that in the content zone screen 20, and with image quality higher than that in the global navigation screen 14. This allows a user to understand intuitively that the user has approached one step to the content zone screen 20 by the screen transition from the global navigation screen 14 to the secondary navigation screen 16. Namely, this allows a user to easily grasp the position of a home screen currently being displayed among a plurality of hierarchized home screens.

If the "Play" category is selected in the global navigation screen, the number of necessary operations made by a user until starting the playback of content can be reduced by the direct transition to a content zone screen. For example, in the initial state of the content zone screen, content of the latest playback date and time is focused on. Therefore, if a user wants to play back the content, the user can start the playback of the content by two steps after the game console 200 is started, i.e., a determination operation for the "Play" category in the global navigation screen, and a determination operation in the default status of a content zone screen.

On the other hand, if the "People" category is selected in the global navigation screen, by allowing the selection of a filtering condition in the secondary navigation screen, user information satisfying the filtering condition is displayed in the content zone screen with a high priority. That is, a screen transition is implemented in accordance with a tendency that, with respect to playback of content, content with the latest playback date and time is likely to be played back, meanwhile with respect to viewing information on other users, the information is often viewed while information on a plurality of users are compared.

In each home screen 10, a common menu for specifying an operation that is independent of layers of screen transitions is displayed at a same position. This allows a user to make the common menu run by a same operation in any of the home screens 10. The common menu includes an item on playback 64. Regardless of the layer on which the home screen 10 being displayed is located, a user can return to a screen of content being played back by a common and easy operation, i.e., by selecting the item on playback 64.

The third layer display unit 288 arranges and displays icons of a plurality of pieces of content that can be played back in the game console 200 in the content zone screen 18. If a specific content icon is focused on, related information on the focused content, the related information being stored in the managing server 102, is displayed in the live area 82 provided below the line of content icons. At the time of displaying the related information, the playback of the focused content is not started yet. Thus, processing load on the game console 200 at the time point when determination of content to be displayed is not finalized can be reduced. If the related information on the focused content is updated in the managing server 102, the updated related information is displayed in the live area 82 instead of the old related information. Thereby, the latest related information on the focused content is provided to a user on every update, and selection of content to be played back can be supported.

According to the embodiment, in order to maintain the visibility of content related information in the live area 82 of a limited size from a certain distance, the number of pieces of content related information to be displayed concurrently in front of the live area 82 is limited to three. The rest of the content related information is displayed in the back of the content related information displayed in the front. This allows a user to easily grasp that content related information that is not displayed in the front exists. Further, the content related information that has been displayed in the front and the content related information that has been displayed in the back are switched as time passes, or in accordance with an update of content related information. This allows a user to sequentially check various types of content related information even with a live area 82 of limited size.

If a preset determination operation is performed in a state where a specific content icon is focused on in the content zone screen 18, a transition to a game screen 50 for displaying a result of playback of the focused content is made. If a preset determination operation is performed in a state where a specific live item is focused on in the content zone screen 18, a transition to a browser screen 30 for displaying detailed content related information on content indicated by the focused item is made. Among browser screens 30, every time an input determination operation is performed, a transition is made to the display of detailed related information that is further from the content zone screen 18 and that is on a deep layer in a stepwise manner. In contrast, every time a cancellation operation is performed, a backward transition is made to the display of detailed related information that is nearer to the content zone screen 18 and that is on a shallow layer in a stepwise manner.

If the PS button 236 is double clicked while a game screen 50 is displayed, the screen transition control unit 264 allows a direct transition from the game screen 50 to a browser screen 30 indicating detailed related information that has been displayed most recently, without displaying the home screen 10. If the PS button 236 is double clicked while a browser screen 30 is displayed and while content being is played back in the background, the screen transition control unit 264 allows a direct transition from the browser screen 30 to a game screen 50 indicating the latest information, without displaying the home screen 10 therebetween.

This allows, during the playback of content (for example, during playing a game), a transition by one operation from the playback screen thereof to a browser screen 30 indicating detailed information on the content being played back (e.g., a game manual, information on how to win a game, etc). In a similar manner, a transition from the playback screen of content to a browser screen 30 for communication (chat or the like) with other users can be made by one operation. In a similar manner, a transition to a browser screen 30 for displaying information of various sites on the Internet (e.g., a moving image sharing Website, etc) and for receiving the benefit of various services on the Internet (e.g., moving image streaming distribution, etc.) can be made by one operation. Information on a browser screen 30 that has been displayed most recently is expected to have relatively strong relation with content selected by a user for playback, thus the browser screen 30 is preferable as a transition destination from a content playback screen.

There are two method in order to make a backward transition from a given browser screen 30 to a home screen 10 (e.g., a content zone screen 18), i.e., returning back in a historical back manner by performing one or more cancellation operation, and returning back by single clicking on the PS button 236. According to the embodiment, in case of returning to the home screen 10 by single clicking on the PS button 236 and not by the cancellation operation, if the PS button 236 is double clicked in the game screen thereafter, a transition to the browser screen 30 to the browser screen 30, where the PS button 236 has single-clicked on, is made. This is because in case of returning to the home screen 10 by single clicking on the PS button 236, it is expected that a user has an intention to return to the browser screen 30 that is the transition starting point thereof again, being different from the case of returning back to the home screen 10 in a historical back manner. In other words, the reason therefore is that the information on the browser screen 30 where the single click on the PS button 236 has been made is expected to have relatively strong relation with content selected by a user for playback.

According to the aspect of the invention, under the limitation that both a game screen 50 and a browser screen 30 is displayed on the television monitor 204 in full screen, a transition can be made from the game screen 50 to the browser screen 30 for displaying content related information that a user wants with an easy operation. A switch between a home screen 10 and a game screen 50 and a switch between a home screen 10 and a browser screen 30 are induced by a single click on the PS button 236. On the other hand, a switch between a game screen 50 and a browser screen 30 is induced by a double click on the PS button 236. This provides a preferable operation method for a controller 202 that has a limitation on the type of input operation (i.e., that has a small number of input means). This also provides an operation method according to a human's sense, such as, a single click for a normal screen transition, and a double click for a direct switch between a game screen 50 and a browser screen 30 while bypassing a home screen 10.

Second Embodiment

In the second embodiment, an explanation will be given on a variation of the first embodiment with respect to a process of displaying a live item 92 in the content zone screen 18 and in the content zone screen 20. Although according to the first embodiment, the display of a plurality of types of related information summaries are managed separately, according to the second embodiment, the display of the related information summaries are managed on a set by set basis, wherein a set is a grouped plurality of types of related information summaries. Herein after, an explanation will be given while referring to the content zone screen 18 shown in FIG. 9. A set may be implemented as a storage area provided in memory in order to store an allocated related information summary.

As described above, in case that the status of a specific content icon 84 changes to the focused status in the content area 80, the related information acquiring unit 266 acquires a plurality of types of related information summaries relating to the focused content from the managing server 102. By allocation one or more related information summaries to one set, the related information display unit 294 allocates each related information summary to one of a plurality of sets. In other words, the related information display unit 294 groups a plurality of related information summaries into a couple of/several sets.

More specifically, for one set, one or more related information summaries are allocated, wherein the upper limit thereof is set by a data size (predetermined image size and/or text size) that can be displayed in the live items 92 with the number that can be concurrently displayed in the front of the live area 82 (three in accordance with the embodiment). If the size of each related information summary is less than or equal to a data size that can be displayed in one live item 92, the related information display unit 294 allocates three related information summaries to one set. In this case, if the number of related information summaries is nine, each related information summary is allocated to one of the three set. On the other hand, if the size of one related information summary exceeds the data size that can be displayed in one live item 92, the related information summary needs to be displayed across a plurality of live items 92. Therefore, the related information display unit 294 allocates one or two related information summaries to one set.

In this example, the number of related information summaries is assumed to be 7, and related information display unit 294 is assumed to provide three sets (herein after referred to as a first set, a second set, and a third set). It is also assumed that three related information summaries are allocated to the first set, and two related information summaries are allocated to each of the second set and the third set. That is, the second set and to the third set include one related information summary of a size required to be displayed across two live items 92, and one related information summary of a size that fits into one live item 92, respectively. The live area defining unit 292 sets the live area 82 in three layers in the depth direction, and displays three live items 92 on a front layer, a middle layer, and a backmost layer, respectively. Herein after, the live items are referred to as a "first layer item group," a "second layer item group," and a "third layer item group," in the order starting from the front of the screen.

When displaying a plurality of related information summaries in the plurality of live items 92, the related information display unit 294 determines a display position on a set by set basis, and switches display positions on a set by set basis. For example, in an initial status where a specific content icon 84 is focused on in the content area 80, three related information summaries that belong to the first set are displayed in the first layer item group, two related information summaries that belong to the second set are displayed in the second layer item group, and two related information summaries that belong to the third set are displayed in the third layer item group. In case of displaying one related information summary in a plurality of live items 92, the related information display unit 294 displays the information so that the nearer to the beginning of the related information summary the information is written, the more left the live item 92 in which the information is displayed is positioned among the plurality of live items 92.

In a similar manner as that of the first embodiment, the display of the live area 82 is updated if a predetermined switch condition is satisfied. For example, if a predetermined time period has elapsed after having started displaying a related information summary that belongs to a specific set in the first layer item group, the related information display unit 294 switches the display so that the related information summaries that belong to the set is displayed in the third layer item group collectively. Further, the related information display unit 294 switches the display so that the related information summaries that have been displayed in the second layer item group are displayed in the first layer item group collectively. Further, the related information display unit 294 switches the display so that the related information summaries that have been displayed in the third layer item group are displayed in the second layer item group collectively.

As described above in the first embodiment, the contents of respective related information summaries are updated from moment to moment. In case that a related information summary that belongs to a specific set is updated, the display may be switched so that related information summaries that belong to the specific set are displayed in the first layer item group collectively. In case that the related information summaries that belong to the specific set are already being displayed in the first layer item group, a time period by the next display position switch may be extended by resetting the display time.

By the configuration of the game console 200 according to the second embodiment, under the limitation on the number of live items 92 that can be displayed concurrently in front of the live area 82, the display of the live area 82 that can take a flexible approach to the data size of the related information summary can be realized. That is, the display of one or more related information summaries are managed collectively, by defining a set corresponding to the data size of live items 92 that are concurrently displayed in the front of the live area 82 as a unit. This prevents that a part of information is displayed in the back while another part of the information is displayed in the front, even if the data size of related information summary is large and the display across a plurality of live items 92 are required. Therefore, the deterioration of the visibility of the related information summary can be restricted. In addition, a large data size of a related information summary can be permitted up to the data size that can be displayed in a plurality of live items 92. Thus, the limitation on data size can be alleviated.

It is needless to mention that the configuration described above can be also applied to the display of a related information summary in the live item 92 in case that a content icon 84 is focused on in the content zone screen 20 shown in FIG. 11.

Given above is an explanation based on the first embodiment and the second embodiment. The embodiments are intended to be illustrative only and it will be obvious to those skilled in the art that various modifications to constituting elements and processes could be developed and that such modifications are also within the scope of the present invention.

According to the embodiments described above, a double click on the PS button 236 allows a direct transition between a game screen 50 for displaying results of playback/execution of content, and a browser screen 30 for viewing various types of information. However, the technical idea according to the embodiments is not limited to a screen transition between the game screen 50 and the browser screen 30. For example, the game console 200 may comprise an application screen display unit that displays a result of execution of an application other than a game (herein after referred to as an "application screen"), as a screen that includes a browser screen 30. The application screen display unit displays, in the application screen, an execution result of a plurality of types of applications (for example, music, a still image, a moving image, an application for business use, etc.) other than game applications. Further, the application screen display unit displays, as an application screen, a screen (i.e., a browser screen 30) for viewing application data as information stored in the device itself or other device.

In case that a game screen 50 and an application screen are displayed selectively in accordance with a result of menu selection in the home screen 10, the screen transition control unit 264 allows a direct transition between the game screen 50 and the application screen by a double click on the PS button 236. This variation of the embodiments has a similar effect as that of the embodiments. For example, during the execution of a game application, a transition from the game screen to another application screen can be made by one operation, and a backward transition to the game screen can be made by one operation. In a similar manner as that of the browser screen display unit 276, the application screen display unit switches the display of a plurality of application screens in the direction departing from the home screen 10 by a determination operation, and switches the display of a plurality of application screens in the direction returning back to the home screen 10 by a cancellation operation. If the PS button 236 is double clicked in the game screen 50, the screen transition control unit 264 allows a direct transition to an application screen that has been displayed most recently.

Although not mentioned in the embodiment above, the related information summaries registered in the managing server 102 may include position specification information that specifies a display position in the live area 82. This position specification information is information indicating one of three live items 92 (herein after referred to as a "left item," a "middle item," and a "right item", respectively) displayed concurrently in the front of the live area 82.

In this case, as a variation of the first embodiment, when switching a related information summary to be displayed in the live item 92 that is displayed in front of the live area 82 (herein after referred to as a "front item"), if the front item is the left item, the related information display unit 294 displays a related information summary that specifies the left item by position specification information from among related information summaries that have been displayed in the background until that moment. In a similar manner, if the front item is the middle item, the related information display unit 294 displays a related information summary that specifies the middle item by the position specification information, and if the front item is the right item, the related information display unit 294 displays a related information summary that specifies the right item by the position specification information. This allows each related information summary to be displayed at a specified position. In case that a plurality of related information summaries specify a same item, the information summaries may be displayed so that the longer a time elapsed is after the display of the summary is stopped in the front, the higher priority is given to the summary, in a similar manner as that of the embodiment.

As a variation of the second embodiment, a set is provided with storage areas that are independent from one another and that store related information summaries to be displayed in the left item, in the middle item, and in the right item, respectively (herein after referred to as a "storage area for left items," a "storage area for middle items," and a "storage area for left items"). When allocating a related information summary to a set, the related information display unit 294 stores the related information summary in a storage area corresponding to position specification information attached to the related information summary. The related information display unit 294 allocates related information summaries that specify a live item 92 at a same position to different sets. When displaying related information summaries on a set by set basis with respect to live item 92 of each layer (the "first layer item group," the "second layer item group," and the "third layer item group" described above), the related information display unit 294 defines a related information summary stored in the storage area for left items as the left item, defines a related information summary stored in the storage area for middle items as the middle item, and defines a related information summary stored in the storage area for right items as the right item. This allows each related information summary to be displayed at a specified position.

According to the variation of the embodiment, a person who registered the related information summary (e.g., a developer/vendor of content, a manager of the multimedia playback system 100 (managing server 102), etc.) can specify a position for displaying related information summary in a content zone screen of the game console 200, which is an end user terminal. For example, the person can specify that newly arrived information on focused content is displayed as a left icon that can be focused on with a small number of cursor operations, and can specify that an advertisement of other games suggesting a user to purchase is displayed as a right icon.

Although not mentioned in the embodiment above, the focus control unit 282 may determine the display mode of the cursor 86 in case of focusing on a specific piece of content in the content zone screen 18, in accordance with the display mode of a background 88 that is displayed during the content is focused on. The display mode of the cursor 86 may be a shape, a pattern, or a color of the cursor 86, or an arbitrary combination thereof. The display mode of a background 88 may be a picture, a pattern, or a color of the background 88, or an arbitrary combination thereof. According to the variation of the embodiment, the cursor 86 can be displayed in a mode appropriate to the appearance of the background 88, for example, in a mode according to the theme of the background 88.

For example, a content developer may determine a background image when a content icon is focused on in the content zone screen 18 and the display mode of the cursor 86 that is suitable to the background image. Image data to be displayed in the background 88 and a parameter indicating the display mode of the cursor 86 may be recorded in game software, and the data may be stored in the content data storing unit 254 with the installation of the game software. In case that a specific content icon 84 is displayed at a focus position in the content zone screen 18, the background defining unit 296 acquires a background image corresponding to content that can be focused from the content data storing unit 254, and displays the image on the background 88 of the content zone screen 18. The focus control unit 282 may acquire a parameter of the cursor 86 corresponding to the focused content from the content data storing unit 254 and may display the cursor 86 in a mode specified by the parameter. Thereby, the content developer can determine the mode of the cursor 86 for focusing on the content of the content developer himself, arbitrarily.

It will be obvious to those skilled in the art that the function to be achieved by each constituent element described in the claims may be achieved by each constituting element shown in the embodiments and in the modifications or by a combination of the constituting elements. For example, a content screen display unit described in the claims may be implemented by the game screen display unit 274 or the browser screen display unit 276 according to the embodiment, or may be implemented by cooperation of these components. A cursor display unit described in the claims may be implemented by the focus control unit 282 according to the embodiment. A menu screen display unit described in the claims may be implemented by the home screen display unit 272 according to the embodiment.

DESCRIPTION OF THE REFERENCE NUMERALS

100 multimedia playback system, 102 managing server, 200 game console, 202 controller, 204 television monitor, 262 operation detecting unit, 264 screen transition control unit, 265 user information acquiring unit, 266 related information acquiring unit, 268 content playback unit, 272 home screen display unit, 274 game screen display unit, 276 browser screen display unit, 280 common menu display unit, 282 focus control unit, 284 first layer display unit, 286 second layer display unit, 288 third layer display unit, 290 content icon display unit, 292 live area defining unit, 294 related information display unit, and 296 background defining unit.

The present invention is applicable to an information processing apparatus for displaying a screen relating to electronic content.

The invention claimed is:

1. An information processing apparatus comprising:
a first layer display unit configured to produce data for a first screen on a first hierarchical layer, the first screen including one or more categories of content that are selectable by a user when displayed, the categories of content representing classifications of a plurality of content items;
a second layer display unit configured to produce data for a second screen on a second hierarchical layer, the second screen including a plurality of filtering options that are selectable by the user when displayed and that may be applied to the plurality of content items that are classified under one of the categories selected by the user in the first screen;
a third layer display unit configured to produce data for a third screen on a layer lower than the first hierarchical layer and the second layer, and the third screen including a set of content items corresponding to a selected one of the filtering options by the user from the second screen;
a content screen display unit configured to produce data for a screen of selected content for display when transitioning from the third screen upon selection of a specific piece of content from the third screen; and a common menu display unit that produces data for a common menu at a same position in the first screen, in the second screen, and in the third screen, the common menu for specifying an operation that is independent of layers of the screen transitions, where the common menu display unit produces the data, as the common menu, an item indicating content that is played back in a background, and when the item is selected, the content screen display unit switches to producing data for a screen of the content being played back and produces the data for said screen, regardless of whether the first screen, the second screen, or the third screen is displayed, wherein the first layer display unit produces the data for the first screen that includes an image of a piece of content from the third screen with image quality lower than that in the case where the image is displayed from the screen of selected content in the third screen, the second layer display unit produces the data for the second screen that includes the image of the piece of content from the third screen with image quality: (i) higher than the image quality of the data for the first screen produced by the first layer display unit, and (ii) lower than that in the case where the image is displayed from the screen of selected content in the third screen, the first layer display unit produces the data for the first screen to include a plurality of menu items, each menu item corresponding to one of a plurality of categories of content, when one of the menu items is focused on by the user, the data for the first screen includes the image of the piece of content from the third screen among a plurality of other images of pieces of other content within the corresponding category from the third screen in advance in the first screen, the data of the first screen being at least partially overlapped by the plurality of menu items, when the user transitions from the focus on the one of the menu items to a focus on another of the menu items, the data for the first screen changes to include a plurality of other images of pieces of other content within another category from the third screen in advance in the first screen, the data of the first screen remaining at least partially overlapped by the plurality of menu items.

2. The information processing apparatus according to claim 1, wherein the first layer display unit produces the data for the first screen to include a plurality of menus corresponding to a plurality of categories, and, when one of the menus is focused on by the user during display, the first layer display unit produces the data in advance in the first screen an image of at least a portion of the third screen that for display when a determination operation for the focused menu is performed.

3. The information processing apparatus according to claim 1, wherein the second layer display unit produces data for the second screen that includes an image of a piece of content from the third screen with image quality higher than that in the case for the image in the first screen.

4. The information processing apparatus according to claim 1, wherein:
the second layer display unit produces the data for the second screen to include a condition for content to be displayed with a high priority in the third screen;
the information processing apparatus further comprises a screen transition control unit;

the plurality of categories in the first screen includes a first category for playing back content and a second category for viewing, as content, information on other users; and when the second category is selected in the first screen, the screen transition control unit allows a transition to the second screen, and otherwise when the first category is selected in the first screen, the screen transition control unit allows a direct transition to the third screen without allowing a transition to the second screen.

5. The information processing apparatus according to claim 1, wherein:
the second layer display unit produces the data for the second screen to include a condition for content to be displayed with a high priority in the third screen, and
the first layer display unit produces the data for the first screen to include an image of at least a portion of the second screen with image quality lower than that in the case where the image is produced for display in the second screen.

6. An information processing method comprising:
producing data for a first screen on a first layer, the first screen including one or more categories of content that are selectable by a user when displayed, the categories of content representing classifications of a plurality of content items;

producing data for a second screen on a second layer, the second screen including a plurality of filtering options that are selectable by the user when displayed and that may be applied to the plurality of content items that are classified under one of the categories selected by the user in the first screen;

producing data for a third screen on a layer lower than the first layer and the second layer, and the third screen including a set of content items corresponding to a selected one of the filtering options by the user from the second screen;

producing data for a screen of selected content for display when transitioning from the third screen upon selection of a specific piece of content from the third screen;

producing data for a common menu at a same position in the first screen, in the second screen, and in the third screen, the common menu for specifying an operation that is independent of layers of the screen transitions, where the common menu display unit produces the data, as the common menu, an item indicating content that is played back in a background, and when the item is selected, the producing data for the common menu includes switching to producing data for a screen of the content being played back and producing the data for said screen, regardless of whether the first screen, the second screen, or the third screen is displayed, wherein the step of producing data for the first screen includes producing an image of a piece of content from the third screen with image quality lower than that in the case where the image is displayed from the screen of selected content in the third screen, the step of producing data for the second screen includes the image of the piece of content from the third screen with image quality: (i) higher than the image quality of the data for the first screen produced by the first layer display unit, and (ii) lower than that in the case where the image is displayed from the screen of selected content in the third screen, wherein the producing data for the first screen includes a plurality of menu items, each menu item corresponding to one of a plurality of categories of content, when one of the menu items is focused on by the user, the data for the first screen includes the image of the piece of content from the third screen among a plurality of other images of pieces of other content within the corresponding category from the third screen in advance in the first screen, the data of the first screen being at least partially overlapped by the plurality of menu items, and when the user transitions from the focus on the one of the menu items to a focus on another of the menu items, the data for the first screen changes to include a plurality of other images of pieces of other content within another category from the third screen in advance in the first screen, the data of the first screen remaining at least partially overlapped by the plurality of menu items.

7. A non-transitory computer-readable recording medium containing a computer program, which when executed by a computer, causes the computer to carry out actions, comprising:

producing data for a first screen on a first layer, the first screen including one or more categories of content that are selectable by a user when displayed, the categories of content representing classifications of a plurality of content items;

producing data for a second screen on a second layer, the second screen including a plurality of filtering options that are selectable by the user when displayed and that may be applied to the plurality of content items that are classified under one of the categories selected by the user in the first screen;

producing data for a third screen on a layer lower than the first layer and the second layer, and the third screen including a set of content items corresponding to a selected one of the filtering options by the user from the second screen;

producing data for a screen of selected content for display when transitioning from the third screen upon selection of a specific piece of content from the third screen;

producing data for a common menu at a same position in the first screen, in the second screen, and in the third screen, the common menu for specifying an operation that is independent of layers of the screen transitions, where the common menu display unit produces the data, as the common menu, an item indicating content that is played back in a background, and when the item is selected, the producing data for the common menu includes switching to producing data for a screen of the content being played back and producing the data for said screen, regardless of whether the first screen, the second screen, or the third screen is displayed, wherein the step of producing data for the first screen includes producing an image of a piece of content from the third screen with image quality lower than that in the case where the image is displayed from the screen of selected content in the third screen, the step of producing data for the second screen includes the image of the piece of content from the third screen with image quality: (i) higher than the image quality of the data for the first screen produced by the first layer display unit, and (ii) lower than that in the case where the image is displayed from the screen of selected content in the third screen, wherein the producing data for the first screen includes a plurality of menu items, each menu item corresponding to one of a plurality of categories of content, when one of the menu items is focused on by the user, the data for the first screen includes the image of the piece of content from the third screen among a plurality of other images of pieces of other content within the corresponding category from the third screen in advance in the first screen, the data of the first screen being at least partially overlapped by the plurality of menu items, and when the user transitions from the focus on the one of the menu items to a focus on another of the menu items, the data for the first screen changes to include a plurality of other images of pieces of other content within another category from the third screen in advance in the first screen, the data of the first screen remaining at least partially overlapped by the plurality of menu items.

8. An information processing apparatus comprising:

a first layer display unit configured to produce data for a first screen on a first hierarchical layer, the first screen including one or more categories of content that are selectable by a user when displayed, the categories of content representing classifications of a plurality of content items;

a second layer display unit configured to produce data for a second screen on a second hierarchical layer, the second screen including a plurality of filtering options that are selectable by the user when displayed and that may be applied to the plurality of content items that are classified under one of the categories selected by the user in the first screen;

a third layer display unit configured to produce data for a third screen on a layer lower than the first hierarchical layer and the second layer, and the third screen including a set of content items corresponding to a selected one of the filtering options by the user from the second screen; and a content screen display unit configured to produce data for a screen of selected content for display when transitioning from the third screen upon selection of a specific piece of content from the third screen, wherein:

the first layer display unit produces the data for the first screen that includes an image of a piece of content from the third screen with image quality lower than that in the case where the image is displayed from the screen of selected content in the third screen, the second layer display unit produces the data for the second screen that includes the image of the piece of content from the third screen with image quality: (i) higher than the image quality of the data for the first screen produced by the first layer display unit, and (ii) lower than that in the case where the image is displayed from the screen of selected content in the third screen, the first layer display unit produces the data for the first screen to include a plurality of menu items, each menu item corresponding to one of a plurality of categories of content, when one of the menu items is focused on by the user, the data for the first screen includes the image of the piece of content from the third screen among a plurality of other images of pieces of other content within the corresponding category from the third screen in advance in the first screen, the data of the first screen being at least partially overlapped by the plurality of menu items, when the user transitions from the focus on the one of the menu items to a focus on another of the menu items, the data for the first screen changes to include a plurality of other images of pieces of other content within another category from the third screen in advance in the first screen, the data of the first screen remaining at least partially overlapped by the plurality of menu items, the second layer display unit produces the data for the second screen to include a condition for content to be displayed with a high priority in the third screen, the information processing apparatus further comprises a screen transition control unit, the plurality of categories in the first screen includes a first category for playing back content and a second category for viewing, as content, information on other users, and when the second category is selected in the first screen, the screen transition control unit allows a transition to the second screen, and otherwise when the first category is selected in the first screen, the screen transition control unit allows a direct transition to the third screen without allowing a transition to the second screen.

* * * * *